(12) United States Patent
Li et al.

(10) Patent No.: US 11,674,024 B2
(45) Date of Patent: Jun. 13, 2023

(54) SEQUENTIAL, DOUBLE ELASTOMER VULCANIZATION SYSTEM, METHOD AND COMPOSITION

(71) Applicant: ExxonMobil Chemical Patents Inc., Baytown, TX (US)

(72) Inventors: Shushuang Li, Shanghai (CN); Sudhin Datta, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 120 days.

(21) Appl. No.: 17/315,907

(22) Filed: May 10, 2021

(65) Prior Publication Data

US 2021/0371633 A1    Dec. 2, 2021

Related U.S. Application Data

(60) Provisional application No. 63/032,188, filed on May 29, 2020.

(51) Int. Cl.
*C08L 23/08* (2006.01)
*C08L 23/16* (2006.01)
*C08L 9/00* (2006.01)
*C08J 3/24* (2006.01)

(52) U.S. Cl.
CPC .......... *C08L 23/0815* (2013.01); *C08J 3/243* (2013.01); *C08J 3/245* (2013.01); *C08L 23/16* (2013.01); *C08F 2810/20* (2013.01); *C08L 9/00* (2013.01); *C08L 2205/03* (2013.01)

(58) Field of Classification Search
None
See application file for complete search history.

(56) References Cited

U.S. PATENT DOCUMENTS

| | | |
|---|---|---|
| 4,087,485 A | 5/1978 | Huff |
| 5,656,693 A | 8/1997 | Ellul et al. |
| 6,747,099 B1 | 6/2004 | Novits et al. |
| 7,872,075 B2 | 1/2011 | Ellul et al. |
| 2004/0195550 A1 | 10/2004 | Debaud et al. |
| 2007/0021564 A1 | 1/2007 | Ellul et al. |
| 2020/0024436 A1 | 1/2020 | Tsou et al. |

FOREIGN PATENT DOCUMENTS

| | | |
|---|---|---|
| WO | 02/28946 | 4/2002 |
| WO | 02/077089 | 10/2002 |
| WO | 2005/092966 | 10/2005 |

*Primary Examiner* — Richard A Huhn

(57) ABSTRACT

Sequential, double elastomer vulcanization method, system, and composition. First and second immiscible elastomers are mixed together with a first additive package. A first curative system is activated to vulcanize the first elastomer in a dispersed phase of the first elastomer to form a partially vulcanized mixture while maintaining melt flowability of the second elastomer in a continuous phase. Then, a second curative system is activated to vulcanize the second elastomer in the continuous phase. Since the partially vulcanized mixture is melt processable, a second additive package can be introduced to the mixture after activating the first curative system. Or, the second curative system can be activatable at a temperature which is higher than an activation temperature of the first curative system. In this manner, blends of dissimilar elastomers can be vulcanized with independent control of plasticizer, filler and curative distribution.

33 Claims, 4 Drawing Sheets

SEQUENTIAL, DOUBLE ELASTOMER VULCANIZATION SYSTEM, METHOD AND COMPOSITION

CROSS REFERENCE TO RELATED APPLICATION

This application claims the priority benefit of U.S. Ser. No. 63/032,188, filed May 29, 2020, which is incorporated herein by reference.

BACKGROUND

The engineering properties of elastomers (i.e., tensile strength, hysteresis) in vulcanized compounds depend not only on the elastomer itself but also on the amount and identity of the fillers and plasticizers, as well as on the extent of cure. Miscible blends of elastomers that consist of a single elastomeric phase with microscopically uniform crosslinking and distribution of reinforcing agents reflect a compositionally weighted average of the intrinsic properties of the constituents Immiscible blends show additional, more complex changes due to a microscopically inhomogeneous phase structure of the two component elastomers and have the potential of providing properties which are not characteristic of any one known elastomer. These potentially improved properties include chemical, physical, and processing benefits.

In an immiscible blend, the amount of these additives in each phase must be modulated by changes in the viscosity and chemical identity of the elastomer, the surface chemistry of the filler, the chemical nature of the plasticizer, and the sequence of addition of the components as well as the details of the mixing and the vulcanization procedure. However, the target levels of additives and vulcanization in each phase are typically not achieved due to migration of plasticizers, fillers and curatives between the phases, which leads to degradation of properties.

However, it is difficult to target the properties of the different phases because the two separate phases typically have differences in the retention of the fillers and plasticizers as well as vulcanization in the presence of the curative. Adjusting fillers and plasticizers to desirable levels for one of the elastomer phases often results in an undesirable level of fillers and plasticizers in the other elastomer phase. As a result, efforts to change the properties of elastomers in blends of immiscible elastomers have involved an uneven distribution of fillers and vulcanization, both interphase as well as intra phase. A large body of experimental procedures has been developed to attain a thermodynamically metastable, but predictable interphase distribution of additives in blends. On vulcanization, this distribution is rendered immobile and leads to desirable engineering properties of the blend. While there are many examples of the uses of elastomer blends, empirical guidelines for the creation of novel blends of elastomers is a comparatively more difficult proposition.

References of interest include U.S. Pat. Nos. 4,087,485; 5,656,693; 6,747,099; US 2004/0195550; US 2020/0024436; WO 2002/028946; WO 2002/077089; WO 2005/092966; U.S. patent application Ser. No. 11/180,235; and U.S. patent application Ser. No. 11/246,773.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

We solve the problem for the distribution of fillers and vulcanization in blends of dissimilar elastomers which differ in cure rate and affinity to fillers and plasticizers by vulcanizing the mixture in two separate stages. In the first stage, a first curative system preferentially cures the first elastomer in a dispersed phase within the other second elastomer, while the second elastomer is relatively inert to the first curative system. This forms a composite of the cured first elastomer and the uncured second elastomer, which remains flowable in a continuous phase. The cure of the second elastomer is a separate event, which may be initiated later, for example, by adding the second curative system or a component thereof such as a co-agent at a time subsequent to activation of the first curative system, and/or by heating the mixture to different curing temperatures, e.g., where the first curative system is activated at a relatively lower curing temperature below a curing temperature of the second curative, and the second curative is then activated at a relatively higher curing temperature. It is expected that the plasticizers and fillers for the second elastomer are added prior to this second separate vulcanization.

In this manner, the plasticizers and fillers for each elastomer can be controllably distributed to engineer the properties of each phase as well as the composite.

In one aspect, embodiments of the present invention provide a sequential, double vulcanization method, comprising the steps of: (a) mixing first and second immiscible elastomers together with a first additive package comprising component(s) of a first curative system, and optionally component(s) of a first plasticizer system, or component(s) of a first filler system, or a combination thereof; (b) activating the first curative system to vulcanize the first elastomer in a dispersed phase of the first elastomer to form a partially vulcanized mixture while maintaining melt flowability of the second elastomer in a continuous phase; (c) optionally mixing the partially vulcanized mixture together with a second additive package comprising component(s) of a second curative system, component(s) of a second plasticizer system, component(s) of a second filler system, or a combination thereof; and (d) vulcanizing the second elastomervulcanizing the second elastomer in the continuous phase by radiation or by activating a chemical curative in the second curative system.

In another aspect, embodiments of the invention provide a shaped article formed by the sequential, double-vulcanization process.

In another aspect, embodiments of the present invention provide a double vulcanization system, comprising: (1) first and second immiscible elastomers; (2) a first additive package comprising component(s) of a first curative system, and optionally component(s) of a first plasticizer system, or component(s) of a first filler system, or a combination thereof; (3) wherein the first curative system is activatable to vulcanize the first elastomer in a dispersed phase of the first elastomer to form a partially vulcanized mixture while maintaining melt flowability of the second elastomer in a continuous phase; (4) a second additive package comprising component(s) of a second curative system, component(s) of a first plasticizer system, component(s) of a first filler system, or a combination thereof; and (5) wherein the second curative system is activatable to vulcanize the second elastomer in the continuous phase by radiation or by activating a chemical curative in the second curative system.

In a further aspect, embodiments of the present invention provide a double-vulcanized elastomer composition, comprising: (A) a mixture of first and second immiscible elastomers; (B) wherein the first elastomer is vulcanized with a first curative system in a dispersed phase; (C) wherein the second elastomer is vulcanized in a continuous phase with a second curative system; (D) a first additive package comprising at least one component preferentially received by the first elastomer, the first additive package comprising component(s) of the first curative system, component(s) of a first plasticizer system, component(s) of a first filler system, or a combination thereof; and (E) a second additive package comprising at least one component preferentially received by the second elastomer, the second additive package comprising component(s) of the second curative system, component(s) of a second plasticizer system, component(s) of a second filler system, or a combination thereof.

DETAILED DESCRIPTION

Definitions

Figure 1:
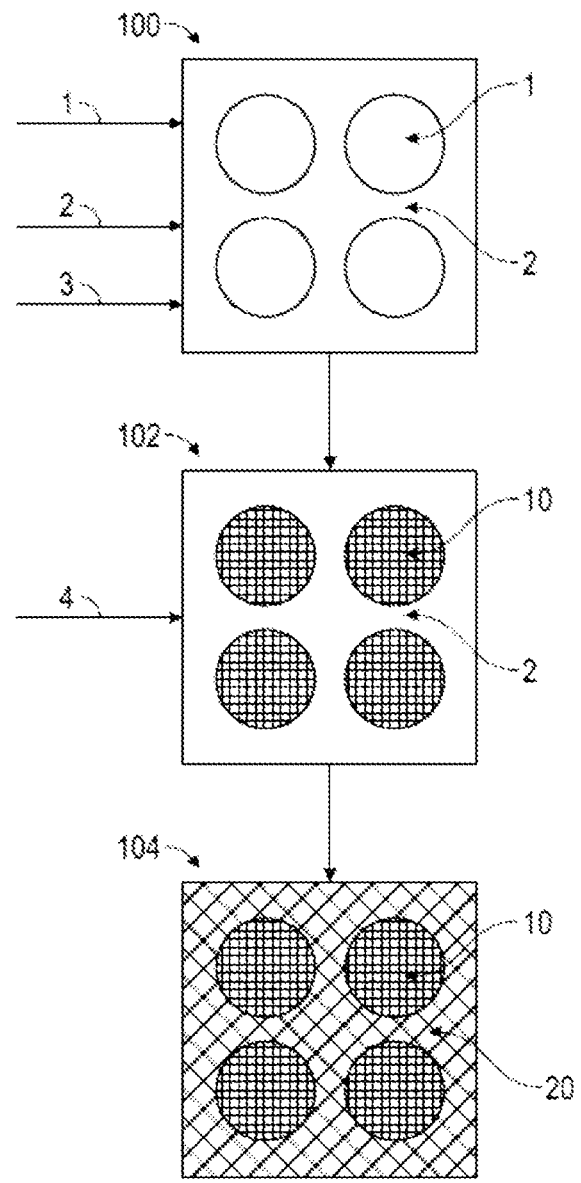
FIG. 1 is a schematic flow diagram of a double elastomer system though evolution from an un-crosslinked blend (UXB), to a single-crosslinked blend (SXB), and then to a double-crosslinked blend (DXB), according to embodiments of the present invention.

Throughout the entire specification, including the claims, the following terms shall have the indicated meanings. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

As used herein, the indefinite article "a" or "an" shall mean "at least one" unless specified to the contrary or the context clearly indicates otherwise. Thus, embodiments comprising "a package" include embodiments comprising one, two, or more packages, unless specified to the contrary or the context clearly indicates only one package is included.

All numerical values within the detailed description and the claims herein are modified by "about" or "approximately" the indicated value, and take into account experimental error and variations that would be expected by a person having ordinary skill in the art.

An "additive package" is one or usually more materials usually but not necessarily added as a group or concurrently.

The term "alpha-olefin elastomer" refers to an elastomer of ethylene, propylene, and/or butylene with an alpha-olefin comonomer of 6 or more carbon atoms, e.g., ethylene-octene copolymer.

The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

An "antioxidant" is an additive to inhibit oxidation of a material.

The terms "catalyst" and "catalyst compound" are defined to mean a compound capable of initiating catalysis and/or of facilitating a chemical reaction with little or no poisoning/consumption.

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. Any device or method or system described herein can be comprised of, can consist of, or can consist essentially of any one or more of the described elements.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of this disclosure. Additionally, they do not exclude impurities and variances normally associated with the elements and materials used. "Consisting essentially of" a component in this disclosure can mean, e.g., comprising, by weight, at least 80 wt %, of the given material, based on the total weight of the composition comprising the component.

As used herein, "curative" is an agent or system that promotes or facilitates a chemical process employed in polymer chemistry and process engineering that produces the toughening or hardening of a polymer material by cross-linking of polymer chains; a vulcanizing agent or system. A curative agent or system can induce curing with or without the use of chemical additives, for example, by using chemical reagent(s) such as sulfur, peroxides, etc., and/or by using radiation such as an electron beam, corona discharge, ultraviolet radiation, etc. A curative may also be referred to as a cure agent.

As used herein, "dynamic vulcanization" refers to the crosslinking of one polymer in a blend of polymers during the active mixing of molten polymers.

An "elastomer" is a polymer with viscoelasticity (i.e., both viscosity and elasticity) and has weak intermolecular forces, generally low modulus and high failure strain compared with other materials. The terms "elastomer" and "rubber" are used interchangeably herein. Referencing ASTM D1566 *"Standard Terminology Relating to Rubber,"* preferred rubbers herein are materials that are capable of recovering (e.g., by at least 80%) from large deformations (e.g., of greater than 100%), and can be, or already are, modified to a state in which it is essentially insoluble (but can swell) in boiling solvent, such as benzene. For purposes of this invention, plastomers, e.g., ethylene copolymers and propylene copolymers having a density of less than 0.910 g/cc (ASTM D 1505), such as 0.905 g/cc or less, such as 0.86 g/cc to 0.905 g/cc, are considered elastomers.

A "filler" is additive particles or fibers that can be added to improve a specific property of a material or to make it more cost effective.

The term "melt flowability" refers to a material that has a melt flow rate of at least 0.7 g/10 min when tested according to ASTM 1238 (21.6 kg and 230° C., provided however that a weight of 2.16 kg is used when the material being tested has a value of more than 500 g/10 min when tested with a weight of 21.6 kg).

In this disclosure, a method or process is described as comprising at least one "step." It should be understood that each step is an action or operation that may be carried out once or multiple times in the process, in a continuous or discontinuous fashion. Unless specified to the contrary or the context clearly indicates otherwise, multiple steps in a process may be conducted sequentially in the order as they are listed, with or without overlapping with one or more other step, or in any other order, as the case may be. In addition, one or more or even all steps may be conducted simultaneously with regard to the same or different batch of material. For example, in a continuous process, while a first step in a process is being conducted with respect to a raw material just fed into the beginning of the process, a second step may be carried out simultaneously with respect to an intermediate material resulting from treating the raw materials fed into the process at an earlier time in the first step. Preferably, the steps are conducted in the order described.

In the present disclosure, all molecular weight data are reported in the units of g·mol$^{-1}$ (g/mol). Unless indicated otherwise, molecular weight of oligomer or polymer materials and distribution thereof in the present disclosure are determined using gel permeation chromatography employing a WATERS™ 150° C. high temperature chromatographic unit equipped with three linear mixed bed columns (Polymer Laboratories, 10 micron particle size), operating at a system temperature of 25° C. and 160° C. The solvent is 1,2,4-trichlorobenzene (TCB), from which 0.5 wt % solutions of the samples were prepared for injection. The flow rate is 1.0 milliliter/minute and the injection size is 100 microliters. The molecular weight determination is deduced by using narrow molecular weight distribution polystyrene standards in conjunction with their elution volumes.

The term "olefin," alternatively termed "alkene," refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be linear, branched, or cyclic. Thus, an "olefin" is intended to embrace all structural isomeric forms of olefins, unless it is specified to mean a single isomer, or the context clearly indicates otherwise. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of".

In the present disclosure, unless specified otherwise, percent refers to percent by weight, and may be expressed as "wt %."

A "plasticizer" is a chemical added especially to rubbers and resins to impart a lower melt viscosity, flexibility, workability, or stretchability.

The polydispersity index (PDI), also referred to as the molecular weight distribution (MWD), of the material is the ratio of Mw/Mn.

A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. An oligomer is a polymer having a low molecular weight, such as an Mn of 21,000 g/mol or less (preferably 10,000 g/mol or less), and/or a low number of mer units, such as 100 mer units or less (preferably 75 mer units or less).

As used herein, a "system" is a regularly interacting or interdependent group of items forming a unified whole.

The term "unsaturated elastomer" or "unsaturated rubber" refers to an elastomer comprising olefinic unsaturation by which the unsaturated elastomer may be crosslinked or functionalized.

The following abbreviations are used: DiCup is dicumyl peroxide; DMTA is dynamic mechanical thermal analysis; DXB is double-crosslinked blend; EO is ethylene-octene copolymer rubber; EPDM is ethylene-propylene-diene monomer rubber; GPC is gel permeation chromatography or gel permeation chromatogram; MFR is melt flow rate, g/10 min, ASTM 1238 condition 21.6 kg@230° C. unless otherwise indicated; PHR or phr is parts per hundred rubber; RT is room temperature and is 23° C. unless otherwise indicated, RIO is resin in oil; SXB is single-crosslinked blend; TCB is 1,2,4-trichlorobenzene; UXB is un-crosslinked blend; and XL is crosslinked.

Sequential, Double Vulcanization Method

In one aspect, the present invention provides a sequential, double-vulcanization method, comprising the steps of: (a) mixing first and second immiscible elastomers together with a first additive package comprising component(s) of a first curative system, and optionally component(s) of a first plasticizer system, or component(s) of a first filler system, or a combination thereof; (b) activating the first curative system to vulcanize the first elastomer in a dispersed phase of the first elastomer to form a partially vulcanized mixture while maintaining melt flowability of the second elastomer in a continuous phase; (c) optionally mixing this partially vulcanized mixture together with a second additive package comprising component(s) of a second curative system, component(s) of a second plasticizer system, component(s) of a second filler system, or a combination thereof; and (d) vulcanizing the second elastomer in the continuous phase by radiation or by activating a chemical curative in the second curative system.

In any embodiment, the first elastomer(s) is present at 1 to 99 wt % (alternately 10 to 99 wt %, alternately 20 to 90 wt %, alternately 30 to 80 wt %, alternately 40 to 75 wt %) and the second elastomer is present at 99 to 1 wt % (alternately 90 to 1 wt %, alternately 80 to 10 wt %, alternately 70 to 20 wt %, alternately 60 to 25 wt %), based upon the weight of the elastomers.

In any embodiment, at least one component of the first additive package is preferably preferentially distributed in the first elastomer during the first curative system activation step. The preference of the at least one component of the first additive package for the first elastomer can be modulated by one or more of selecting a viscosity of the first elastomer, selecting a chemical identity of the first elastomer, selecting a surface chemistry of the first filler system, selecting a chemical nature of the first plasticizer system, selecting an order of addition of the first filler system and the first plasticizer system, selecting mixing conditions for step (a) comprising shear rate, temperature, and duration, and combinations thereof, and so on. After the first curative has been activated, the combination of the cured first elastomer and the second elastomer advantageously has melt flowability, e.g., has a melt flow rate of 0.7 g/10 min to less than 500 g/10 min (alternately from 0.70 g/10 min to 400 g/10 min, alternately 0.75 to 300 g/10 min, alternately 0.80 to 200 g/10 min, alternately from 0.85 to 150 g/10 min) when tested according to ASTM 1238 (21.6 kg and 230° C., provided however that a weight of 2.16 kg is used when the material being tested has a value of more than 500 g/10 min when tested with a weight of 21.6 kg). Alternately, the composition comprising the cured first elastomer, the second elastomer, and optional modifiers, such as plasticizer systems, fillers systems, etc., has melt flowability of 0.7 to 500 g/10 min (alternately from 0.70 g/10 min to 400 g/10 min, alternately 0.75 to 300 g/10 min, alternately 0.80 to 200 g/10 min, alternately from 0.85 to 150 g/10 min) when tested according to ASTM 1238 (21.6 kg and 230° C., provided however that a weight of 2.16 kg is used when the material being tested has a value of more than 500 g/10 min when tested with a weight of 21.6 kg).

In any embodiment, at least one component of the second additive package is preferably preferentially distributed in the second elastomer during the second curative system activation step. The preference of the at least one component of the first additive package for the second elastomer can be modulated by one or more of selecting a viscosity of the second elastomer, selecting a chemical identity of the second elastomer, selecting a surface chemistry of the second filler system, selecting a chemical nature of the second plasticizer system, selecting an order of addition of the second filler system and the second plasticizer system, selecting mixing conditions for step (c) comprising shear rate, temperature, and duration, and combinations thereof, and so on.

In any embodiment, the first and/or second additive packages can further comprise an antioxidant system.

In any embodiment, the method can further comprise processing, preferably including molding, calendaring, or extruding the partially vulcanized mixture prior to vulcanization of the second elastomer. If desired, the partially vulcanized mixture can be recovered following activation of the first curative system and prior to the vulcanization of the second elastomer.

In any embodiment, the method can further comprise, prior to vulcanization of the second elastomer, admixing the partially vulcanized mixture with a second additive package comprising the second curative system or a component thereof, a second plasticizer system or a component thereof, a second filler system or a component thereof, or a combination thereof.

In any embodiment, the second curative system can be activated by heating the partially vulcanized mixture to an activation temperature of the second curative system that is higher than an activation temperature of the first curative system. If desired, the second curative system or a component thereof can be mixed with the mixture of the first and second immiscible elastomers prior to activation of the first curative system.

In any embodiment, the first elastomer preferably comprises an unsaturated elastomer, more preferably EPDM; the second elastomer preferably comprises an alpha-olefin elastomer, more preferably an ethylene-octene copolymer; the first curative system preferably comprises resin in oil and a co-catalyst, more preferably $SnCl_2$; and the second curative system preferably comprises peroxide, more preferably dicumyl peroxide, even more preferably dicumyl peroxide dispersed in clay.

In any embodiment, a shaped article can be produced by the sequential, double-vulcanization method described herein, e.g., mixing first and second immiscible elastomers together with a first additive package comprising a first plasticizer system, a first filler system, or a combination thereof; activating a first curative system to vulcanize the first elastomer in a dispersed phase of the first elastomer to form a partially vulcanized mixture while maintaining melt flowability of the second elastomer in a continuous phase;

molding, calendaring, or extruding the partially vulcanized mixture; and vulcanizing the second elastomer in the continuous phase.

Double Vulcanization System

In another aspect, the present invention provides a double vulcanization system, comprising: (1) first and second immiscible elastomers, (2) a first additive package comprising component(s) of a first curative system, and optionally component(s) of a first plasticizer system, or component(s) of a first filler system, or a combination thereof; (3) wherein the first curative system is activatable to vulcanize the first elastomer in a dispersed phase of the first elastomer to form a partially vulcanized mixture while maintaining melt flowability of the second elastomer in a continuous phase; (4) a second additive package comprising component(s) of a second curative system, component(s) of a second plasticizer system, component(s) of a second filler system, or a combination thereof; and (5) wherein the second curative system is activatable to vulcanize the second elastomer in the continuous phase by radiation or by activating a chemical curative in the second curative system.

Preferably, in this system, at least one component of the first additive package is preferentially distributed in the first elastomer during dynamic vulcanization. In this system, the preference of the at least one component of the first additive package for the first elastomer is preferably modulated by one or more of selecting a viscosity of the first elastomer, selecting a chemical identity of the first elastomer, selecting a surface chemistry of the first filler system, selecting a chemical nature of the first plasticizer system, selecting an order of addition of the first filler system and the first plasticizer system, selecting mixing conditions for the first additive package comprising shear rate, temperature, and duration, and combinations thereof.

Preferably, in this system, at least one component of the second additive package is preferentially distributed in the second elastomer. In this system, the preference of the at least one component of the second additive package for the second elastomer is preferably modulated by one or more of selecting a viscosity of the second elastomer, selecting a chemical identity of the second elastomer, selecting a surface chemistry of the second filler system, selecting a chemical nature of the second plasticizer system, selecting an order of addition of the second filler system and the second plasticizer system, selecting mixing conditions for the second additive package comprising shear rate, temperature, and duration, and combinations thereof.

If desired, the first and/or second additive packages in the system can further comprise an antioxidant system.

If desired, the partially vulcanized mixture is recoverable in this system following activation of the first curative system and prior to the vulcanization of the second elastomer.

If desired, the second additive package is mixable with the partially vulcanized mixture prior to vulcanization of the second elastomer.

Preferably, the second curative system can be activatable by heating the partially vulcanized mixture to an activation temperature of the second curative system that is higher than an activation temperature of the first curative system. If desired, one or more component(s) of the second curative system can be present in the mixture of the first and second immiscible elastomers during activation of the first curative system.

Preferably, the first elastomer in the double-vulcanization system comprises an unsaturated elastomer, more preferably EPDM; the second elastomer comprises an alpha-olefin elastomer, more preferably an ethylene-octene copolymer; the first curative system comprises resin in oil and a co-catalyst, more preferably $SnCl_2$; and the second curative system comprises peroxide, more preferably dicumyl peroxide, and even more preferably dicumyl peroxide dispersed in clay.

Double Vulcanized Elastomer Composition

In another aspect, the present invention provides a double vulcanized elastomer composition, comprising: (A) a mixture of first and second immiscible elastomers; (B) wherein the first elastomer is vulcanized with a first curative system in a dispersed phase; (C) wherein the second elastomer is vulcanized in a continuous phase with a second curative system, (D) a first additive package comprising at least one component preferentially received by the first elastomer, the first additive package comprising component(s) of the first curative system, component(s) of a first plasticizer system, component(s) of a first filler system, or a combination thereof; and (E) a second additive package comprising at least one component preferentially received by the second elastomer, the second additive package comprising component(s) of the second curative system, component(s) of a second plasticizer system, component(s) of a second filler system, or a combination thereof.

In any embodiment of the double-vulcanized elastomer composition, the preference of the at least one component of the first additive package for the first elastomer is modulated by one or more of a viscosity of the first elastomer, a chemical identity of the first elastomer, a surface chemistry of the first filler system, a chemical nature of the first plasticizer system, an order of addition of the first filler system and the first plasticizer system, and mixing conditions for the first additive package comprising shear rate, temperature, duration, and so on.

In any embodiment of the double-vulcanized elastomer composition, the preference of the at least one component of the second additive package for the second elastomer is modulated by one or more of a viscosity of the second elastomer, a chemical identity of the second elastomer, a surface chemistry of the second filler system, a chemical nature of the second plasticizer system, an order of addition of the second filler system and the second plasticizer system, and mixing conditions for the second additive package comprising shear rate, temperature, duration, and so on.

If desired, the first and/or second additive packages in the composition can comprise an antioxidant system.

In any embodiment, the double-vulcanized elastomer composition can comprise the product of the process comprising the sequential steps of: (a) mixing the first and second immiscible elastomers together with the first additive package; (b) activating the first curative system under dynamic conditions to vulcanize the first elastomer in a dispersed phase of the first elastomer to form a partially vulcanized mixture while maintaining melt flowability of the second elastomer in a continuous phase; (c) optionally mixing the partially vulcanized mixture together with the second additive package; and (d) vulcanizing the second elastomer. If desired, the process can further comprise the step of processing the partially vulcanized mixture, preferably including molding, calendaring, or extruding the partially vulcanized mixture prior to vulcanization of the second elastomer. If desired, the process can further comprise the step of, prior to vulcanization of the second elastomer, admixing the partially vulcanized mixture with the second additive package. If desired, the process can further comprise the step of heating the partially vulcanized mixture to an activation temperature of the second curative system that is higher than an activation temperature of the first curative system. If desired, the process can further comprise the step of mixing the second curative system with the mixture of the first and second immiscible elastomers prior to activation of the first curative system.

In any embodiment, the second curative system is preferably activated by heating.

In any embodiment, the first elastomer comprises an unsaturated elastomer and the second elastomer comprises an alpha-olefin elastomer. For example, the first curative system can be resin in oil and a co-catalyst, preferably $SnCl_2$; and the second curative system can be peroxide, preferably dicumyl peroxide, more preferably dicumyl peroxide dispersed in clay.

Preferably, the first elastomer in the double-vulcanization composition comprises an unsaturated elastomer, more preferably EPDM; the second elastomer comprises an alpha-olefin elastomer, more preferably an ethylene-octene copolymer; the first curative system comprises resin in oil and a co-catalyst, more preferably $SnCl_2$; and the second curative system comprises peroxide, more preferably dicumyl peroxide, and even more preferably dicumyl peroxide dispersed in clay.

Double Vulcanization Procedure

Generally, the first step of the process is mixing the first and second elastomers, the first curative system, and the first additive package, using equipment such as, but not limited to a CARVER press for melt pressing the components together, internal mixers such as a BANBURY mixer or a BRABENDER mixer for solution or melt blending of the components, and equipment used for continuous mixing procedures including single and twin screw extruders, static mixers, impingement mixers, as well as other machines and processes designed to disperse the components in intimate contact. The compositions described herein may be prepared by any procedure that obtains an intimate mixture of the polymeric components. Such procedures are well known to those of ordinary skill in the art.

With reference to FIG. 1, upon melt mixing, the uncrosslinked blend (UXB) system 100 is shown with the internal first elastomer phase 1 dispersed in an external phase of the second elastomer 2 in the presence of a first additive package 3. The additive package 3 can include a first plasticizer system or component thereof, a first filler system or component thereof, and/or one or more chemical components of a first curative system. The additive package 3 may optionally also include other additives such as an antioxidant system, one or more chemical components of a second curative system, and so on. A desirably complete mixture of the polymeric components is indicated by the uniformity of the morphology of the composition.

As mentioned above, at least one component of the first additive package 3 is preferably preferentially distributed in the first elastomer 1 before the first curative system activation. The preference of the at least one component of the first additive package 3 for the first elastomer 1 can be modulated by one or more of selecting a viscosity of the first elastomer 1, selecting a chemical identity of the first elastomer 1, selecting a surface chemistry of the first filler system, selecting a chemical nature of the first plasticizer system, selecting an order of addition of the first filler system and the first plasticizer system, selecting mixing conditions comprising shear rate, temperature, and duration, and combinations thereof, and so on. Desirably, the component(s) of the first additive package 3 other than the first curative system component(s) can be added and thoroughly mixed, and then one or more of the first curative system components can be added for dynamic vulcanization.

Then, following activation of the first curative system, the single-crosslinked blend (SXB) system 102 is shown in FIG. 1 with the crosslinked internal elastomer phase 10 dispersed in an external phase of the elastomer phase 2. In general, the first curative system is activated by addition of the components of the first curative system to the system 100 and/or the application of heat, e.g., external heating and/or by the heat of mixing. In any embodiment, the crosslinking of the first elastomer phase 1 preferably occurs dynamically such that the dispersion and crosslinking of the elastomer phase 1 occurs concurrently or simultaneously where the system passes directly to UXB system 102 with only transient, or without any, formation of a discrete UXB system 100, e.g., where the elastomer 1 is dispersed in the mixture and dynamically crosslinked to elastomer phase 10 at the same time.

Following activation of the first curative system and crosslinking of the first elastomer phase 10 in SXB system 102, a second additive package 4 can be added, and mixed in the SXB system 102. In any embodiment, all or part of the second additive package can be added in the same mixing device used for the preparation of the SXB system 102, or it can be added in another mixing device, e.g., after recovery of the SXB system 102 and/or just prior to vulcanization of the second elastomer. The second additive package 4 can include a second plasticizer system or component thereof, a second filler system or component thereof, and/or one or more chemical component(s) of a second curative system, if not previously added. The second additive package 4 can optionally also include one or more other additives as described herein.

In general, the second curative system is activated by addition of any components of the second curative system to the system 100 and/or 102, the application of heat, e.g., external heating and/or by the heat of mixing, and/or subjecting the SXB system 102 to a source of radiation energy. Then, following activation of the second curative system, the double crosslinked (DXB) system 104 is shown in FIG. 1 with the crosslinked internal elastomer phase 10 dispersed in crosslinked external elastomer phase 20.

In any embodiment, chemical component(s) of the second curative system can be added to the SXB system 102, after activation of the first curative system. Adding the second curative system component(s) post-SXB generally leads to higher efficiency due to inhibition of the migration of the component(s) into the crosslinked first elastomer phase 10. Alternatively, or additionally, where inactive at the activation conditions of the first curative system, chemical component(s) of the second curative system can be added to the UXB system 100 prior to activation of the first curative system. For example, the second curative system may require a higher activation temperature, so that its activation is deferred post-SXB until the system 102 is heated to the activation of the second curative system. Conversely, adding chemical components of the second curative system preSXB can be advantageous in that it can simplify the DXB procedure by reducing the extent of the second additive package and the degree of the post-SXB mixing that is needed.

In one exemplary embodiment, the elastomers 1, 2 (such as unsaturated rubber 1 and saturated rubber 2) can be melted and mixed in a heated mixing device with an oil component of the first additive package 3, followed by addition of the first curative system components (such as sulfur, sulfur based curatives, resin in oil, zinc oxide and/or stannous chloride catalyst) and dynamic mixing to SXB system 102. Then the SXB system 102 can be recovered, e.g., by extrusion, pelletizing, and cooling. Next, the second additive package 4 comprising a chemical curative, such as a peroxide, and an oil plasticizer, is mixed with the intimate mixture of elastomers 10, 2 in SXB system 102, the intimate mixture including the chemical curative is fabricated into the final shape of the article, and then the temperature is raised for an extended period of time to allow the crosslinking of the saturated elastomer. In another embodiment, the intimate mixture is fabricated into the final shape of the article, and then the article exposed to an external curative agent, such as high energy radiation, to allow crosslinking of the saturated elastomer.

Immiscible Elastomers

The immiscible elastomers are generally selected such that a mixture results in a dispersed phase of the first elastomer in a continuous phase of the second elastomer, and also such that the second elastomer can be cured by a different curative system. Preferably, the second elastomer is essentially inert to the first curative system used to crosslink the first elastomer in the mixture of the first and second elastomers, e.g., such that the second elastomer remains melt processable before activating the second curative system. The immiscible elastomers may also form a co-continuous blend where the two polymers form an interpenetrating network but are not present in a single phase. The combined immiscible elastomers do not form a single phase and/or do not exhibit a single set of properties. In embodiments, the dispersed phase of first elastomer is a finely divided occluded phase or a co-continuous phase. Typically, the first elastomer within these blends can be in the form of finely-divided and well-dispersed particles of cured rubber within a continuous phase of the second elastomer, and optionally, the rubber particles can have an average diameter that is less than 2 µm, such as less than 1 µm.

As a non-limiting example, the first elastomer can be selected from unsaturated rubbers that can be cured by vulcanization with sulfur or another system as the first curative system that exploits the reactivity of the unsaturation in the rubber, and the second elastomer can be selected from saturated rubbers that are immiscible in the selected first elastomer and generally cannot be effectively cured by the sulfur or other selected first curative system.

As unsaturated rubbers, there can be mentioned natural isoprene such as cis-1,4-polyisoprene natural rubber (NR) and trans-1,4-polyisoprene gutta percha; synthetic polyisoprene such as isoprene rubber (IR); polybutadiene, also called butadiene rubber (BR); chloroprene rubber (CR), available under the trade designations NEOPRENE, BAYPREN, and so on; butyl rubber such as isobutylene-co-isoprene (IIR) and including halogenated butyl rubbers such as chlorobutyl rubber (CIIR) and bromobutyl rubber (BIIR); styrene-butadiene rubber (SBR); nitrile rubber, i.e., butadiene-co-acrylonitrile (NBR), which is also called Buna N rubber, and including hydrogenated nitrile rubbers (HNBR) such as available under the trade designations THERBAN and ZETPOL; ethylene-propylene-diene monomer rubber (EPDM); and the like.

As saturated rubbers, there can be mentioned alpha-olefin elastomer, such as ethylene-propylene rubber (EPM) or ethylene-octene copolymer (EO); epichlorohydrin rubber (ECO); polyacrylic rubber (ACM or ABR); silicone rubber (SI, Q, or VMQ); fluorosilicone rubber (FVMQ); fluoroelastomers (FKM and FEPM) such as available under the trade designations VITON, TECNOFLON, FLUOREL, AFLAS, and DAI-E1; polyether block amides (PEBA); chlorosulfonated polyethylene (CSM) such as HYPALON; ethylene-vinyl acetate (EVA); and the like.

For the purposes of simplicity and clarity, reference is made herein to the system where EPDM is the unsaturated first elastomer and E0 is the saturated second elastomer, by way of illustration and example, and not by way of limitation.

Curative Systems

The curing systems that may be used in the practice of the invention include one or more of sulfur-based curatives, peroxide curatives, resin cure, hydrosilylation, labile or migratory curative systems, high energy radiation, and so on. Such curing systems are well known in the art. In some embodiments, the articles made from the compositions described herein may be of a thickness such that the article is cured by a curing system other than high energy radiation. When using a chemical curing agent, such as sulfur, sulfur donors, peroxides, and resins, to induce the reaction, the curing agent is generally mixed into the respective elastomer, or the blend of the elastomers, prior to the fabrication of the final shape of the article to be made. On the other hand, when using an external agent to induce the reaction, such as reactive chemicals and high energy radiation, the elastomer blend is fabricated into the final shape of the article to be made prior to contact with the external agent.

Curatives for use herein can include sulfur, zinc oxide, fatty acids, and peroxide cure systems. Generally, the elastomer(s) can be crosslinked by adding curative molecules, for example sulfur, metal oxides (i.e., zinc oxide), organometallic compounds, radical initiators, etc., followed by heating. In particular, the following are common curatives that may be used: $ZnO$, $CaO$, $MgO$, $Al_2O_3$, $CrO_3$, $FeO$, $Fe_2O_3$, $NiO$. These metal oxides can also be used in conjunction with the corresponding metal stearate complex (e.g., $Zn(Stearate)_2$, $Ca(Stearate)_2$, $Mg(Stearate)_2$, and $Al(Stearate)_3$), or with stearic acid, and a sulfur compound or an alkylperoxide compound.

Depending on the rubber component employed, certain curatives can be selected. For example, where elastomeric copolymers containing units deriving from vinyl norbornene are employed, a peroxide curative may be chosen.

Depending on the rubber component employed, certain curatives can be selected. Useful phenolic cure systems are disclosed in U.S. Pat. Nos. 2,972,600, 3,287,440, 5,952,425 and 6,437,030, for example. In one or more embodiments, phenolic resin curatives include resins which can be made by the condensation of alkyl substituted phenols or unsubstituted phenols with aldehydes, for example formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms may be employed. In one embodiment, a blend of octylphenol-formaldehyde and nonylphenol-formaldehyde resins are employed. The blend includes from about 25 to about 40 wt % octylphenol-formaldehyde and from about 75 to about 60 wt % nonylphenol-formaldehyde, in other embodiments, the blend includes from about 30 to about 35 wt % octylphenol-formaldehyde and from about 70 to about 65 wt % nonylphenol-formaldehyde. In one embodiment, the blend includes about 33 wt % octylphenol-formaldehyde and about 67 wt % nonylphenol-formaldehyde resin, where each of the octylphenol-formaldehyde and nonylphenol-formaldehyde include methylol groups. These blends can be solubilized in paraffinic oil at about 30% solids without phase separation and are often referred to as "resin in oil."

An example of a phenolic resin curative includes that defined according to the general formula

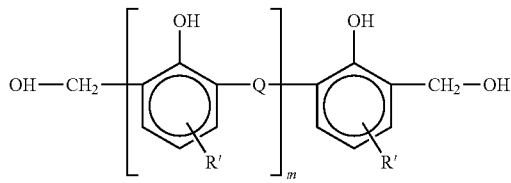

where Q is a divalent radical selected from the group consisting of —CH$_2$—, —CH$_2$—O—CH$_2$—; m is zero or a positive integer from 1 to 20 and R' is an organic group. In one embodiment, Q is the divalent radical —CH$_2$—O—CH$_2$—, m is zero or a positive integer from 1 to 10, and R is an organic group having less than 20 carbon atoms. In other embodiments, m is zero or a positive integer from 1 to 10 and R' is an organic radical having between 4 and 12 carbon atoms.

In one or more embodiments, the phenolic resin is used in conjunction with a cure accelerator such as stannous chloride, and metal oxide such as zinc oxide, which is believed to function as a scorch retarder and acid scavenger and/or polymer stabilizer. Useful zinc oxide includes that conventionally employed for rubber processing. In one or more embodiments, the zinc oxide can have a mean particle diameter of about 0.05 to about 0.15 μm. Useful zinc oxide can be obtained commercially under the tradename Kadox™ 911 (Horsehead, Corp.). In these or other embodiments, the phenolic resin can be used in conjunction with an acid scavenger, such as a hydrotalcite, which may be added downstream of the curative.

In one or more embodiments, the phenolic resin may be employed in an amount from about 2 to about 6 parts by weight, in other embodiments from about 3 to about 5 parts by weight, and in other embodiments from about 4 to about 5 parts by weight per 100 phr. A complementary amount of stannous chloride may include from about 0.5 to about 2.0 parts by weight, in other embodiments from about 1.0 to about 1.5 parts by weight, and in other embodiments from about 1.2 to about 1.3 parts by weight per phr. In conjunction therewith, from about 0.1 to about 6.0 parts by weight, in other embodiments from about 1.0 to about 5.0 parts by weight, and in other embodiments from about 2.0 to about 4.0 parts by weight of zinc oxide may be employed. In one or more embodiments, the olefinic rubber employed with the phenolic curatives includes diene units deriving from 5-ethylidene-2-norbornene.

Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxy)diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy)valerate, benzoyl peroxide, lauroyl peroxide, dilauroyl peroxide, 2,5-dimethyl-2,5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Others include azo initiators including Luazo™ AP (Archema).

In one or more embodiments, the free-radical cure agent may be employed in conjunction with one or more coagents. Coagents may include high-vinyl polydiene or polydiene copolymer, triallylcyanurate, triallyl isocyanurate, triallyl phosphate, sulfur, N,N'-m-phenylenedimaleimide, N,N'-p-phenylenedimaleimide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multi-functional acrylates, multi-functional methacrylates, or oximers such as quinone dioxime. Combinations of these coagents may be employed. For example, combinations of high-vinyl polydienes and α,β-ethylenically unsaturated metal carboxylates are useful. Coagents may also be employed as neat liquids or together with a carrier.

Silicon-containing cure systems may include silicon hydride compounds having at least two SiH groups. Silicon hydride compounds that are useful include, but are not limited to, methylhydrogenpolysiloxanes, methylhydrogendimethylsiloxane copolymers, alkylmethyl-co-methyl-hydrogenpolysiloxanes, bis(dimethylsilyl)alkanes, bis(dimethylsilyl)benzene, and mixtures thereof. An example of a silicon hydride cure agent is commercially available from Dow Chemical under the tradename Silicone Fluid 2-5084. Useful catalysts for hydrosilylation include, but are not limited to, transition metals of Group VIII. These metals include, but are not limited to, palladium, rhodium, and platinum, as well as complexes of these metals. Useful silicon-containing curatives and cure systems are disclosed in U.S. Pat. No. 5,936,028, for example. In one or more embodiments, the silane-containing compounds may be employed in an amount from about 0.5 to about 5.0 parts by weight, in other embodiments from about 1.0 to about 4.0 parts by weight, and in other embodiments from about 2.0 to about 3.0 parts per phr. A complementary amount of catalyst may include from about 0.5 to about 20.0 parts, in other embodiments from about 1.0 to about 5.0 parts, and in other embodiments from about 1.0 to about 2.0 parts of metal per million parts by weight of the rubber. In one or more embodiments, the olefinic rubber employed with the hydrosilylation curatives includes diene units deriving from 5-vinyl-2-norbornene.

The ordinarily skilled chemist will recognize which type of curatives can be used based upon the property requirements, and also be able to determine the amount of curatives or cure agents.

Accelerators

Accelerators that may be used include amines, guanidines, thioureas, thiazoles, thiurams, sulfenamides, sulfenimides, thiocarbamates, xanthates, and the like. Acceleration of the cure process can be accomplished by adding to the composition an amount of the accelerator. The mechanism for accelerated vulcanization of the compositions of the rubbers involve complex interactions between the curative, accelerator, activators and polymers. Ideally, the entire available curative is consumed in the formation of effective crosslinks which join together two polymer chains and enhance the overall strength of the matrix. Numerous accelerators are known in the art and include, but are not limited to, the following: stearic acid, diphenyl guanidine (DPG), tetramethylthiuram disulfide (TMTD), N'N-di-ortho-tolyl guanidine (DOTG), dipentamethylenethiuram tetrasulfide (DPTT), 4,4'-dithiodimorpholine (DTDM), tetrabutylthiuram disulfide (TBTD), 2-mercaptobenzothiazole (MBT), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), N-oxydiethylene thiocarbamyl-N-oxydiethylene sulfonamide (OTOS), zinc diethyldithiocarbamate (ZDEC), zinc 2-ethyl hexanoate (ZEH), and N,N'-diethyl thiourea.

The ordinarily skilled chemist will recognize which type of accelerators can be used based upon the property requirements, and also be able to determine the amount of accelerators.

Additive Packages

Elastomers and elastomer formulations used in making the double vulcanizates may further comprise an additive package comprising oil, including process oil and/or extender oil, and/or filler, including reinforcing and non-reinforcing filler, as well as metal oxides, acid scavengers, reinforcing and non-reinforcing fillers and/or extenders, antioxidants, stabilizers (e.g., UV stabilizers), antiblocking agents, anti-static agents, waxes, foaming agents, pigments, flame retardants, and any other additive, such as processing aids known in the rubber compounding art.

The oils that may be used include hydrocarbon oils and plasticizers, such as organic esters and synthetic plasticizers. Many additive oils are derived from petroleum fractions and have particular ASTM designations depending on whether they fall into the class of paraffinic, naphthenic, or aromatic oils. Other types of additive oils include alpha-olefinic synthetic oils, such as liquid polybutylene. Additive oils other than petroleum-based oils can also be used, such as oils derived from coal tar and pine tar, as well as synthetic oils, e.g., polyolefin materials. In particular embodiments, oil included in the elastomer formulation is selected based on API groupings (e.g., an API Group I, Group II, Group III, Group IV, or Group V base stock oil may be used as the oil in the elastomer formulation). In particular embodiments, oil included in the elastomer formulation comprises Group II or higher oil, such as Group II oil (e.g., ParaLux™ 6001R process oil, available from ChevronTexaco Corp.). Also, or instead, the oil could include white oil (e.g., pharmaceutical grade oil, such as Primol™ 542 medicinal grade white oil, available from ExxonMobil Chemical Company, Baytown, Tex.).

Process oil may be added to an elastomer formulation (and/or may be present in a resulting elastomer composition) in total amounts preferably ranging from 5 to 200 phr, more preferably 50 to 150 phr, such as 75 to 125 phr, with ranges from any of the foregoing lows to any of the foregoing highs also contemplated in various embodiments. Put in terms of wt %, process oil may preferably be added to the elastomer formulation in amounts within the range from 10 to 70 wt %, preferably 20 to 60 wt %, such as 40 to 60 wt %, such weight percentages based on total weight of the elastomer formulation, and with ranges from any of the foregoing lows to any of the foregoing highs also contemplated in various embodiments.

Extender oil may be present in the rubber component, preferably in amounts within the range from 0 phr to 150 phr, such as 25 to 125 phr, or 50 to 100 phr (0 to 30 wt %, preferably 10 to 25 or 12 to 20 wt %, based on total weight of the elastomer formulation), with ranges from any of the foregoing lows to any of the foregoing highs also contemplated.

Total additive oil (extender oil+process oil) may therefore preferably be within the range from 5 to 350 phr (or 5 to 70 wt %) based on total weight of elastomer formulation.

Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene. In one or more embodiments, an elastomer formulation preferably includes at least 5, 6, 7, 8, 9, or 10 wt % of one or more fillers, such as calcium carbonate, clays, silica, talc, titanium dioxide, carbon black, and blends thereof, based on the weight of the elastomer formulation. In preferred embodiments, the elastomer formulation includes clay and/or carbon black in an amount ranging from a low of any one of 5, 6, 7, 8, 9, or 10 to a high of any one of 15, 16, 17, 18, 19, or 20 wt % based on the total weight of the elastomer formulation.

In one or more embodiments, the additive package preferably comprises antioxidants in an amount less than or equal to 5 wt %, or 4 wt %, or 3 wt %, or 2 wt %, or 1 wt %, or 0.5 wt %, based on the total weight of the elastomer formulation.

For example, an elastomer formulation or composition may include reinforcing and non-reinforcing fillers, antioxidants, stabilizers, antiblocking agents, anti-static agents, waxes, foaming agents, pigments, flame retardants and other processing aids (other than the process oils described above) known in the rubber compounding art.

Articles of Manufacture

The partially cured blend, such as after the first stage, can be processed and reprocessed by conventional processing techniques such as extrusion, injection molding, blow molding, and compression molding. The improved composition is suitable for use in a multitude of applications, and further encompasses forming an article with the improved material. Additionally the improved material herein may be formed into intermediate article, such as pellets or bales, and later re-melted or softened to form an article.

The articles of the improved material may be made or formed by any useful discrete molding or continuous extrusion means for forming and shaping polyolefins known in the art, including: compounding, extrusion, sheet extrusion, casting, profile extrusion or co-extrusion, injection molding, thermo-forming, transfer molding, elasto-welding, compression molding, injection molding, co-injection molding, gas-assisted injection molding, transfer molding, foam molding, transfer molding, rotational molding, vacuum forming, lamination, pultrusion, draw reduction, calendering, or other forms of processing such as described in, for example, "Rubber Technology," by Maurice Norton (Van Nostrand Reinhold-New York), or combinations thereof. In one or more embodiments, after processing the article may be further treated, cured, cross-linked, irradiated, heating, and the like, or combined with other articles. In an implementation, the improved material may also be used in the formulation of materials made with a portion of recycled materials.

The blends described herein are particularly useful for making articles including but not limited to automotive parts, consumer goods, industrial goods, construction materials, packaging materials, and the like. In an aspect, the article is includes but is not limited to: cookware, storageware, toys, medical devices, sterilization containers, sheets, crates, containers, packaging, wire and cable jacketing, pipes, roofing sheets, geomembranes, sporting equipment, chair mats, tubing, profiles, instrumentation sample holders, sample windows, outdoor furniture, playground equipment, boat and water craft components, and the like.

Examples of automotive parts include but are not limited to vehicle weather seals, such as for a glass run channel, trunk seals, tailgate seals, cowl seals, gap fillers, glass encapsulation, cut line seals, door seals, hood-to-radiator seals, roof line seals, rocker panels, sashes, and belt-line seals, other vehicle parts and components such as tires, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer-based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked Vs. Additional automotive and vehicle articles include: bumpers, grills, trim parts, dashboards, instrument panels, exterior door and hood components, spoiler, wind screen, hub caps, mirror housing, body panel, and protective side molding, and the like.

In an aspect, the article includes but is not limited to: cookware, synthetic corks, storageware, toys, medical devices, sterilization containers, sheets, crates, containers, packaging, wire and cable jacketing, pipes, roofing sheets, geomembranes, sporting equipment, chair mats, tubing, profiles, instrumentation sample holders, sample windows, outdoor furniture, playground equipment, other automotive components, boat and water craft components, elastic fibers, and the like.

Further molded articles include, but are not limited to a non-automotive seal or gasket; hoses, such as air hose, heat hose, garden hose, industry hose, and the like; building materials, such as roof membranes, building profiles, foam, pipe insulation, cable insulation layers and outside jackets, belts, gaskets, synthetic corks. Consumer goods include but are not limited to electronics, cell phones, construction applications printers, printer parts, sporting goods, soft touch grips, and the like.

In one or more embodiments, the compositions described can be at least partially adhered to a glass substrate, such as for glass encapsulation. Illustrative uses for glass encapsulation include windshield seals, sunroof seals, rear window seals, side window seals, and quarterlight seals, for example. In an embodiment, the composition is extruded using techniques known in the art to form an extruded elastomeric profile or gasket. This extruded profile or gasket is then adhered to the glass substrate.

EMBODIMENTS LIST

Accordingly, the present invention provides the following embodiments:

A1. A sequential, double-vulcanization method, comprising the steps of: (a) mixing first and second immiscible elastomers together with a first additive package comprising component(s) of a first curative system, and optionally component(s) of a first plasticizer system, or component(s) of a first filler system, or a combination thereof; (b) activating the first curative system to vulcanize the first elastomer in a dispersed phase of the first elastomer to form a partially vulcanized mixture while maintaining melt flowability of the second elastomer in a continuous phase; (c) optionally mixing the partially vulcanized mixture together with a second additive package comprising component(s) of a second curative system, component(s) of a second plasticizer system, component(s) of a second filler system, or a combination thereof; and (d) activating a second curative system to vulcanize the second elastomer in the continuous phase.

A2. The sequential, double-vulcanization method of embodiment A1, wherein at least one component of the first additive package is preferentially distributed in the first elastomer during the first curative system activation step and wherein at least one component of the second additive package is preferentially distributed in the second elastomer during the second curative system activation step.

A3. The sequential, double-vulcanization method of embodiment A2, wherein the preference of the at least one component of the first additive package for the first elastomer is modulated by one or more of selecting a viscosity of the first elastomer, selecting a chemical identity of the first elastomer, selecting a surface chemistry of the first filler system, selecting a chemical nature of the first plasticizer system, selecting an order of addition of the first filler system and the first plasticizer system, selecting mixing conditions in step (a) comprising shear rate, temperature, and duration, and combinations thereof; and/or wherein the preference of the at least one component of the second additive package for the second elastomer is modulated by one or more of selecting a viscosity of the second elastomer, selecting a chemical identity of the second elastomer, selecting a surface chemistry of the second filler system, selecting a chemical nature of the second plasticizer system, selecting an order of addition of the second filler system and the second plasticizer system, selecting mixing conditions in step (c) comprising shear rate, temperature, and duration, and combinations thereof.

A4. The sequential, double-vulcanization method of any preceding embodiment, wherein the first and/or second additive packages further comprise an antioxidant system.

A5. The sequential, double-vulcanization method of any preceding embodiment, further comprising processing the partially vulcanized mixture prior to vulcanization of the second elastomer.

A6. The sequential, double vulcanization method of embodiment A5, wherein the processing of the partially vulcanized mixture comprises molding, calendaring, or extruding the partially vulcanized mixture.

A7. The sequential, double-vulcanization method of embodiment A5, further comprising the step of recovering the partially vulcanized mixture following activation of the first curative system and prior to the vulcanization of the second elastomer.

A8. The sequential, double-vulcanization method of any preceding embodiment, wherein the second curative system is activated by heating the partially vulcanized mixture to an activation temperature of the second curative system that is higher than an activation temperature of the first curative system.

A9. The sequential, double-vulcanization method of embodiment A8, further comprising mixing the second curative system or a component thereof with the mixture of the first and second immiscible elastomers prior to activation of the first curative system.

A10. The sequential, double-vulcanization method of any preceding embodiment, wherein the first elastomer comprises an unsaturated elastomer, preferably EPDM, wherein the second elastomer comprises an alpha-olefin elastomer, preferably an ethylene-octene copolymer, wherein the first curative system comprises resin in oil and a co-catalyst, preferably $SnCl_2$, and wherein the second curative system comprises peroxide, preferably dicumyl peroxide, more preferably dicumyl peroxide dispersed in clay.

A11. A shaped article produced by the sequential, double-vulcanization method of any preceding embodiment.

B1. A double-vulcanization system, comprising: (1) first and second immiscible elastomers; (2) a first additive package comprising component(s) of a first curative system, and optionally component(s) of a first plasticizer system, or component(s) of a first filler system, or a combination thereof; (3) wherein the first curative system is activatable to vulcanize the first elastomer in a dispersed phase of the first elastomer to form a partially vulcanized mixture while maintaining melt flowability of the second elastomer in a continuous phase; (4) a second additive package comprising component(s) of a second curative system, component(s) of a first plasticizer system, component(s) of a first filler system, or a combination thereof; and (5) wherein the second curative system is activatable to vulcanize the second elastomer in the continuous phase by radiation or by activating a chemical curative in the second curative system.

B2. The double-vulcanization system of embodiment B1, wherein at least one component of the first additive package is preferentially distributed in the first elastomer during dynamic vulcanization and wherein at least one component of the second additive package is preferentially distributed in the second elastomer during the activation of the second curative system activation step.

B3. The double-vulcanization system of embodiment B2: wherein the preference of the at least one component of the first additive package for the first elastomer can be modulated by one or more of selecting a viscosity of the first elastomer, selecting a chemical identity of the first elastomer, selecting a surface chemistry of the first filler system, selecting a chemical nature of the first plasticizer system, selecting an order of addition of the first filler system and the first plasticizer system, selecting mixing conditions for the first additive package comprising shear rate, temperature, and duration, and combinations thereof; and/or wherein the preference of the at least one component of the second additive package for the second elastomer can be modulated by one or more of selecting a viscosity of the second elastomer, selecting a chemical identity of the second elastomer, selecting a surface chemistry of the second filler system, selecting a chemical nature of the second plasticizer system, selecting an order of addition of the second filler system and the second plasticizer system, selecting mixing conditions for the second additive package comprising shear rate, temperature, and duration, and combinations thereof.

B4. The double-vulcanization system of any preceding embodiment, wherein the first and/or second additive packages further comprise an antioxidant system.

B5. The double-vulcanization system of any preceding embodiment, wherein the partially vulcanized mixture is recoverable following activation of the first curative system and prior to the vulcanization of the second elastomer.

B6. The double-vulcanization system of any preceding embodiment, wherein the second additive package is mixable with the partially vulcanized mixture prior to vulcanization of the second elastomer.

B7. The double-vulcanization system of any preceding embodiment, wherein the second curative system is activatable by heating the partially vulcanized mixture to an activation temperature of the second curative system that is higher than an activation temperature of the first curative system.

B8. The double-vulcanization system of any preceding embodiment, wherein one or more components of the second curative system are present in the mixture of the first and second immiscible elastomers during activation of the first curative system.

B9. The double-vulcanization system of any preceding embodiment, wherein the first elastomer comprises an unsaturated elastomer, preferably EPDM, wherein the second elastomer comprises an alpha-olefin elastomer, preferably an ethylene-octene copolymer, wherein the first curative system comprises resin in oil and a co-catalyst, preferably $SnCl_2$, and wherein the second curative system comprises peroxide, preferably dicumyl peroxide, more preferably dicumyl peroxide dispersed in clay.

C1. A double-vulcanized elastomer composition, comprising: (A) a mixture of first and second immiscible elastomers; (B) wherein the first elastomer is vulcanized with a first curative system in a dispersed phase; (C) wherein the second elastomer is vulcanized in a continuous phase with a second curative system; (D) a first additive package comprising at least one component preferentially received by the first elastomer, the first additive package comprising component(s) of the first curative system, component(s) of a first plasticizer system, component(s) of a first filler system, or a combination thereof; and (E) a second additive package comprising at least one component preferentially received by the second elastomer, the second additive package comprising component(s) of the second curative system, component(s) of a second plasticizer system, component(s) of a second filler system, or a combination thereof.

C2. The double-vulcanized elastomer composition of embodiment C1, wherein the preference of the at least one component of the first additive package for the first elastomer is modulated by one or more of a viscosity of the first elastomer, a chemical identity of the first elastomer, a surface chemistry of the first filler system, a chemical nature of the first plasticizer system, an order of addition of the first filler system and the first plasticizer system, and mixing conditions for the first additive package comprising shear rate, temperature, and duration; and/or wherein the preference of the at least one component of the second additive package for the second elastomer is modulated by one or more of a viscosity of the second elastomer, a chemical identity of the second elastomer, a surface chemistry of the second filler system, a chemical nature of the second plasticizer system, an order of addition of the second filler system and the second plasticizer system, and mixing conditions for the second additive package comprising shear rate, temperature, duration.

C3. The double-vulcanized elastomer composition of any preceding embodiment, wherein the first and/or second additive packages further comprise an antioxidant system.

C4. The double-vulcanized elastomer composition of any preceding embodiment, wherein the elastomer composition comprises the product of the process comprising the sequential steps of: (a) mixing the first and second immiscible elastomers together with the first additive package; (b) activating the first curative system under dynamic conditions to vulcanize the first elastomer in a dispersed phase of the first elastomer to form a partially vulcanized mixture while maintaining melt flowability of the second elastomer in a continuous phase; (c) optionally mixing the partially vulcanized mixture with the second additive package; and (d) vulcanizing the second elastomer.

C5. The double-vulcanized elastomer composition of any preceding embodiment, wherein the process further comprises the step of processing (preferably molding, calendaring, or extruding) the partially vulcanized mixture prior to vulcanization of the second elastomer.

C6. The double-vulcanized elastomer composition of any preceding embodiment, wherein the process further comprises the step of, prior to vulcanization of the second elastomer, admixing the partially vulcanized mixture with the second additive package.

C7. The double-vulcanized elastomer composition of any preceding embodiment, wherein the process further comprises the step of heating the partially vulcanized mixture to an activation temperature of the second curative system that is higher than an activation temperature of the first curative system.

C8. The double-vulcanized elastomer composition of any preceding embodiment, wherein the process further comprises the step of mixing at least one component of the second curative system with the mixture of the first and second immiscible elastomers prior to activation of the first curative system.

C9. The double-vulcanized elastomer composition of any preceding embodiment, wherein the first elastomer comprises an unsaturated elastomer, preferably EPDM, wherein the second elastomer comprises an alpha-olefin elastomer, preferably an ethylene-octene copolymer, wherein the first curative system comprises resin in oil and a co-catalyst, preferably $SnCl_2$, and wherein the second curative system comprises peroxide, preferably dicumyl peroxide, more preferably dicumyl peroxide dispersed in clay.

EXPERIMENTAL

The following testing conditions and procedures were used in the examples which follow:

Melt Flow Rate (MFR, g/10 min): Unless otherwise indicated, melt flow rate was determined per ASTM D-1238 (21.6 kg@ 230° C.).

Mechanical Properties: Tensile properties, including tensile strength and elongation at break, were determined according to ISO 37, Type 3 specimen.

Tear strength was determined according to ASTM D624, Type C specimen.

Tension Set: Tension set was determined according to ASTM D-412.

Shore A Hardness was determined according to ASTM D 2240 (15 sec delay).

Gel permeation chromatography (GPC): GPC was performed according to the following procedure: the polymers were analyzed by GPC on a WATERS 150° C. high temperature chromatographic unit equipped with three linear mixed bed columns (Polymer Laboratories, 10 micron particle size), operating at a system temperature of 25° C. and 160° C. The solvent was 1,2,4-trichlorobenzene (TCB), from which about 0.5% by weight solutions of the samples were prepared for injection. The flow rate was 1.0 milliliter/minute and the injection size was 100 microliters. The molecular weight determination was deduced by using narrow molecular weight distribution polystyrene standards in conjunction with their elution volumes.

Dynamic mechanical thermal analysis (DMTA): DMTA was performed according to the following procedure: the instrument used was RSA-G2 in tension mode (0.05% strain, 1 Hz frequency, 2° C./min heat rate, and a temperature range of ca. −100° C. to 150° C.) Compression-molded samples obtained from a press at 190° C., a molding time of 6 min, and a force of 25 tons, had dimensions of ~23 mm×6.42 mm×0.7 mm and were conditioned under ambient conditions for 24 h before the measurements.

Materials

PP5342E1 is an 0.8 dg/min MFR (ASTM 1238, 230° C., 2.16 kg) isotactic polypropylene available from ExxonMobil Chemical Company.

VISTALON™ 3666 is an oil extended (75 phr) ethylene-propylene-ethylidene-norbornene terpolymer rubber having an MFR of 67.4 g/10 min, 64 wt % ethylene, 4.5 wt % ethylidene norbornene, and a Mooney Viscosity (ML 1+4, 125° C.) of 52MU (ASTM D1646) per manufacturer's literature.

ENGAGE™ 8150 is an ethylene-octene copolymer having a density of 0.868 g/cm$^3$ and an MFR of 0.5 g/10 min (2.16 kg@ 190° C.) available from The Dow Chemical Company.

ENGAGE™ 8200 is an ethylene-octene copolymer having a density of 0.870 g/cm$^3$ and an MFR of 5 g/10 min (2.16 kg@ 190° C.) available from The Dow Chemical Company.

ENGAGE™ 8003 is an ethylene-octene copolymer having a density of 0.885 g/cm$^3$ and an MFR of 1 g/10 min (2.16 kg@ 190° C.) available from The Dow Chemical Company.

ENGAGE™ 8450 is an ethylene-octene copolymer having a density of 0.902 g/cm$^3$ and an MFR of 3 g/10 min (2.16 kg@ 190° C.) available from The Dow Chemical Company.

ENGAGE™ 8480 is an ethylene-octene copolymer having a density of 0.902 g/cm$^3$ and an MFR of 1 g/10 min (2.16 kg@ 190° C.) available from The Dow Chemical Company.

RIO is a resin in oil curative mixture of 30% alkyl phenol resin/70% oil (available from SI Group under the tradename HRJ-14247 A™).

EXAMPLES

Example 1A: In this example, Elastomer 1 was an EPDM terpolymer (VISTALON™ 3666), Elastomer 2 was ethylene-octene (EO) copolymer (ENGAGE™ 8150), having a density of 0.868 g/cm$^3$, and an MFR of 0.5 g/10 min (2.16 kg@ 190° C.), Curative 1 was RIO cocatalyzed with $SnCl_2$/ZnO, and Curative 2 was dicumyl peroxide. Curative 1 was essentially inert on Elastomer 2. A 70:30 weight ratio of EO:EPDM was used. The recipe shown in Table 1 was used:

TABLE 1

| Example 1A—70 ENGAGE 8150:30 VISTALON 3666 | |
| --- | --- |
| Material | Parts by weight |
| VISTALON ™3666 (EPDM with 75 phr oil) | 175 |
| ENGAGE ™ 8150 (EO) | 233 |
| Zinc oxide | 1 |
| Stannous chloride | 1.5 |
| RIO | 10 |
| Dicumyl peroxide | 12 |

The EO and EPDM were mixed at 80 rpm in a BRABENDER™ PLASTICORDER internal mixer with temperature controlled at 160° C. to melt the polymers. See system 100 in FIG. 1. Then, zinc oxide and stannous chloride were added followed by RIO as the first curative. The single crosslinked EO/XL-EPDM was then produced by dynamic vulcanization. See system 102 in FIG. 1. A significant increase of mixing torque was observed in the mixer, consistent with the vulcanization of EPDM. After steady state temperature and mixing torque, the compound was further mixed for 2 minutes, then removed from the mixer and pressed into plaque in compression molding machine at 190° C. for testing. The single-crosslinked system 102 had an MFR of 7.8 g/10 min (21.6 kg@230° C.) and tension set at −30° C. (50% for 22 h), RT (100% for 10 min), and 70° C. (25% for 22 h) of 1.3, 6.8, and 21%, respectively.

The double crosslinked XL-EO/XL-EPDM compound was produced via static vulcanization. See system 104 in FIG. 1. The pre-fabricated EO/XL-EPDM was pre-mixed with the peroxide as the second curative at 50 rpm in the BRABENDER™ PLASTICORDER internal mixer at 100° C. The premixing temperature was controlled below the peroxide decomposition temperature to avoid premature crosslink. The pre-blend was mixed for about 5 minutes, then removed from the mixer. Then the static vulcanization was conducted in a compression-molding machine at 200° C. for 5 minutes to finish the curing and make the fully vulcanized plaque for testing.

Example 1B: The materials and methods of Example 1A were used except the ratio of EO:EPDM was 50:50. The recipe shown in Table 2 was used:

TABLE 2

Example 1B—50 ENGAGE 8150:50 VISTALON 3666

| Material | Parts by weight |
|---|---|
| VISTALON ™ 3666 (EPDM with 75 phr oil) | 175 |
| ENGAGE ™ 8150 (EO) | 100 |
| Zinc oxide | 1 |
| Stannous chloride | 1.5 |
| RIO | 10 |
| Dicumyl peroxide | 12 |

Examples 2A-2B: The materials and methods of Examples 1A-1B were used except the ethylene-octene copolymer used was ENGAGE™ 8200 (density 0.870 g/cm$^3$, MFR=5 g/10 min (2.16 kg@ 190° C.).

Examples 3A-3B: The materials and methods of Examples 1A-1B were used except the ethylene-octene copolymer used was ENGAGE™ 8003 (density 0.885 g/cm$^3$, MFR=1 g/10 min (2.16 kg@190° C.).

Examples 4A-4B: The materials and methods of Examples 1A-1B were used except the ethylene-octene copolymer used was ENGAGE™ 8450 (density 0.902 g/cm$^3$, MFR=3 g/10 min (2.16 kg@ 190° C.).

Examples 5A-5C: The materials and methods of Examples 1A-1B were used in examples 5A-5B, respectively, except the ethylene-octene copolymer used was ENGAGE™ 8480 (density 0.902 g/cm$^3$, MFR=1 g/10 min (2.16 kg@ 190° C.)). In Example 5C the ratio of EO:EPDM was 30:70. The recipe shown in Table 3 was used:

TABLE 3

Example 5C—30 ENGAGE 8480 30 VISTALON 3666

| Material | Parts by weight |
|---|---|
| VISTALON ™ 3666 (EPDM with 75 phr oil) | 175 |
| ENGAGE ™ 8480 (EO) | 43.5 |
| Zinc oxide | 1 |
| Stannous chloride | 1.5 |
| RIO | 10 |
| Dicumyl peroxide | 12 |

Melt Processability of Single-Crosslinked Materials: The MFR of the single-crosslinked systems was evidenced by MFR's for the 70/30 and 50/50 plastomer/rubber (EO/EPDM) blends. The results of MFR analysis are presented in Table 4:

TABLE 4

MFR of Single Crosslinked Systems of EO copolymer with VISTALON ™ 3666

| | | MFR (g/10 mm, 21.6 kg@230° C.) | |
|---|---|---|---|
| Example | EO Copolymer | EO/EPDM ratio (wt/wt) = 70/30 | EO/EPDM ratio (wt/wt) = 50/50 |
| PP/EPDM* | PP5341E1/Vistalon ™ 3666 | — | 67 |
| 1A/1B | ENGAGE ™8150 | 7.8 | 0.9 |
| 2A/2B | ENGAGE ™8200 | 22.2 | 3.5 |
| 3A/3B | ENGAGE ™8003 | 6.0 | 0.9 |
| 4A/4B | ENGAGE ™8450 | 21.8 | 1.6 |
| 5A/5B | ENGAGE ™8480 | 7.1 | 1.5 |

*PP/EPDM is a 50-50 single-crosslinked blend of PP5342E1 and Vistalon ™ 3666 provided for comparative purposes.

The data in Table 4 indicate that all of the single-crosslinked systems were melt processable, having an MFR of at least 0.9 g/10 min.

Tension Set of Single-Crosslinked Materials: The tension set of the single-crosslinked systems was determined for the 70/30, 50/50, and 30/70 plastomer/rubber (Polyolefin/EPDM) blends at RT, −30° C., and 70° C. The results of the analysis are presented in Tables 5A, 5B, and 5C:

TABLE 5A

Tension Set of Single-Crosslinked Blends at RT (100% elongation for 30 min) of polyolefin with VISTALON ™ 3666

| Example | Polyolefin | Polyolefin/EPDM ratio (wt/wt) | Tension Set (%) | Shore A Hardness |
|---|---|---|---|---|
| PP/EPDM* | PP5341E1 | 50/50 | 18.3 | 82.8 |
| 1A | ENGAGE ™ 8150 | 70/30 | 6.8 | 49.2 |
| 1B | ENGAGE ™ 8150 | 50/50 | 4.3 | 43.8 |
| 2A | ENGAGE ™ 8200 | 70/30 | 7.0 | 48.9 |
| 2B | ENGAGE ™ 8200 | 50/50 | 5.8 | 41.3 |
| 3A | ENGAGE ™ 8003 | 70/30 | 10.0 | 63.1 |
| 3B | ENGAGE ™ 8003 | 50/50 | 5.8 | 52.5 |
| 4A | ENGAGE ™ 8450 | 70/30 | 12.8 | 71.6 |
| 4B | ENGAGE ™ 8450 | 50/50 | 7.5 | 57.8 |
| 5A | ENGAGE ™ 8480 | 70/30 | 11.5 | 71.3 |
| 5B | ENGAGE ™ 8480 | 50/50 | 8.0 | 58.0 |
| 5C | ENGAGE ™ 8480 | 30/70 | 5.8 | 45.9 |

*PP/EPDM is a 50-50 single-crosslinked blend of PP5342E1 and VISTALON ™ 3666 provided for comparative purposes.

TABLE 5B

Tension Set of Single-Crosslinked Blends at −30° C. (50% elongation for 22 h) of polyolefin with VISTALON ™ 3666

| Example | Polyolefin | Polyolefin/EPDM ratio (wt/wt) | Tension Set (%) |
|---|---|---|---|
| PP/EPDM * | PP5341E1 | 50/50 | 7.8 |
| 1A | ENGAGE ™ 8150 | 70/30 | 1.3 |
| 1B | ENGAGE ™ 8150 | 50/50 | 0.8 |
| 2A | ENGAGE ™ 8200 | 70/30 | 1.5 |
| 2B | ENGAGE ™ 8200 | 50/50 | 0.8 |
| 3A | ENGAGE ™ 8003 | 70/30 | 1.6 |
| 3B | ENGAGE ™ 8003 | 50/50 | 1.3 |
| 4A | ENGAGE ™ 8450 | 70/30 | 3.0 |
| 4B | ENGAGE ™ 8450 | 50/50 | 1.6 |
| 5A | ENGAGE ™ 8480 | 70/30 | 3.1 |
| 5B | ENGAGE ™ 8480 | 50/50 | 2.2 |
| 5C | ENGAGE ™ 8480 | 30/70 | 0.8 |

* PP/EPDM is a 50-50 single-crosslinked blend of PP5342E1 and Vistalon ™ 3666 provided for comparative purposes

TABLE 5C

Tension Set of Single-Crosslinked Blends at 70° C. (25% elongation for 22 h) of polyolefin with VISTALON™ 3666

| Example | Polyolefin | Polyolefin/EPDM ratio (wt/wt) | Tension Set (%) |
|---|---|---|---|
| PP/EPDM * | PP5341E1 | 50/50 | 15.8 |
| 1A | ENGAGE 8150 | 70/30 | 21 |
| 1B | ENGAGE 8150 | 50/50 | 18.1 |
| 2A | ENGAGE 8200 | 70/30 | 21.5 |
| 2B | ENGAGE 8200 | 50/50 | 18.5 |
| 3A | ENGAGE 8003 | 70/30 | 23.8 |
| 3B | ENGAGE 8003 | 50/50 | 18.8 |
| 4A | ENGAGE 8450 | 70/30 | 17.8 |
| 4B | ENGAGE 8450 | 50/50 | 15 |
| 5A | ENGAGE 8480 | 70/30 | 17 |
| 5B | ENGAGE 8480 | 50/50 | 13.8 |
| 5C | ENGAGE 8480 | 30/70 | 10.3 |

* PP/EPDM is a 50-50 single-crosslinked blend of PP5342E1 and Vistalon™ 3666 provided for comparative purposes As shown by the data in Tables 5A-5C, the lower the plastomer density, the lower the tension set. Also, the higher the EPDM rubber content the lower the tension set. In general, high glass transition temperatures (Tg) lead to poor elasticity at low temperature, whereas low melting temperatures (Tm) lead to poor elasticity at high temperature.

Figure 4:
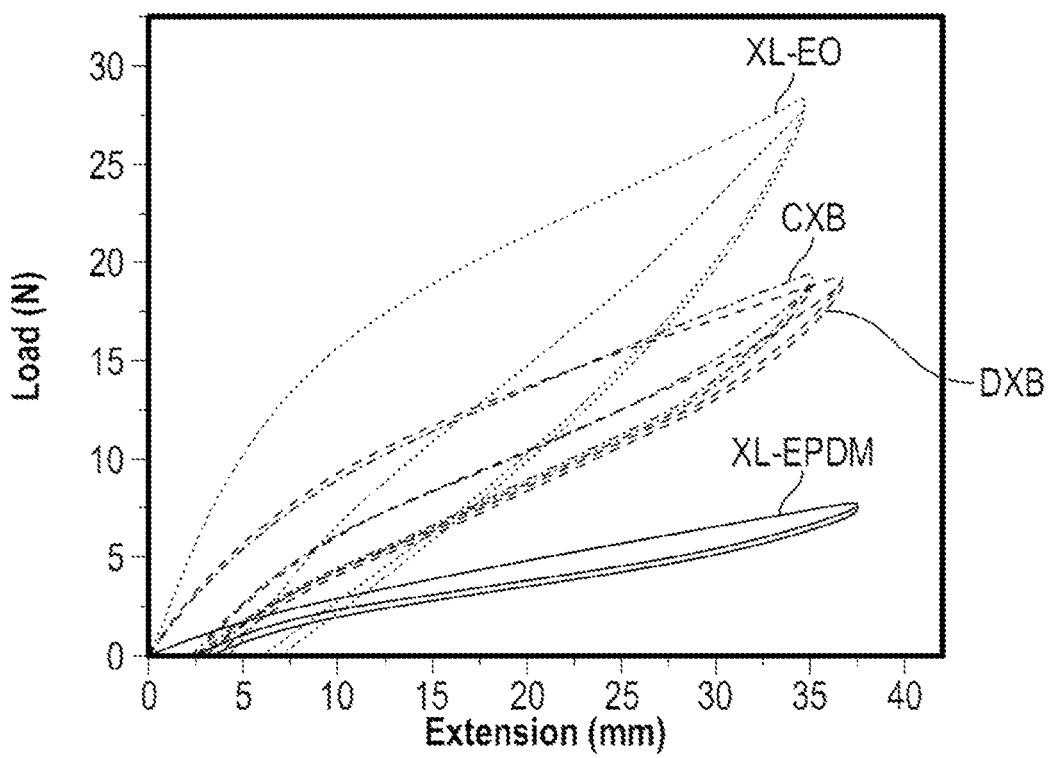
FIG. 4 shows tension set curves for first and second extensions showing hysteresis of the DXB of Example 1A, according to embodiments of the present invention, and also shows the tension set curves for crosslinked EO, crosslinked EPDM, and peroxide co-cured EO/EPDM systems for comparative purposes.

Gel Permeation Chromatography (GPC): Trichlorobenzene (TCB) Dissolution/Filtration. The single-crosslinked blend (SXB) and double crosslinked blend (DXB) of Example 1A (70/30 ENGAGE 8150/EPDM) were subjected to GPC as described above. As controls, GPC was also run on un-crosslinked EPDM (Vistalon™ 3666), un-crosslinked ethylene-octene copolymer (ENGAGE™ 8150). The results are presented in FIG. 4 and Table 6:

TABLE 6

Solubility fractions from GPC of Ex. 1A (70/30 ENGAGE 8150/VISTALON 3666)

| Sample | Oil | Free EO | Free EPDM | Insoluble | Total[1] |
|---|---|---|---|---|---|
| UXB: Un-crosslinked blend | 20 | 56 | 24 | 0.5 | 100.5 |
| SXB: Single crosslinked blend | 21 | 48.6 | 5.3 | 26 | 100.9 |
| DXB: Double crosslinked blend | 17 | 0.6 | 0.4 | 82 | 100 |

[1]total may not equal 100 due to rounding and/or experimental error.

Figure 2:
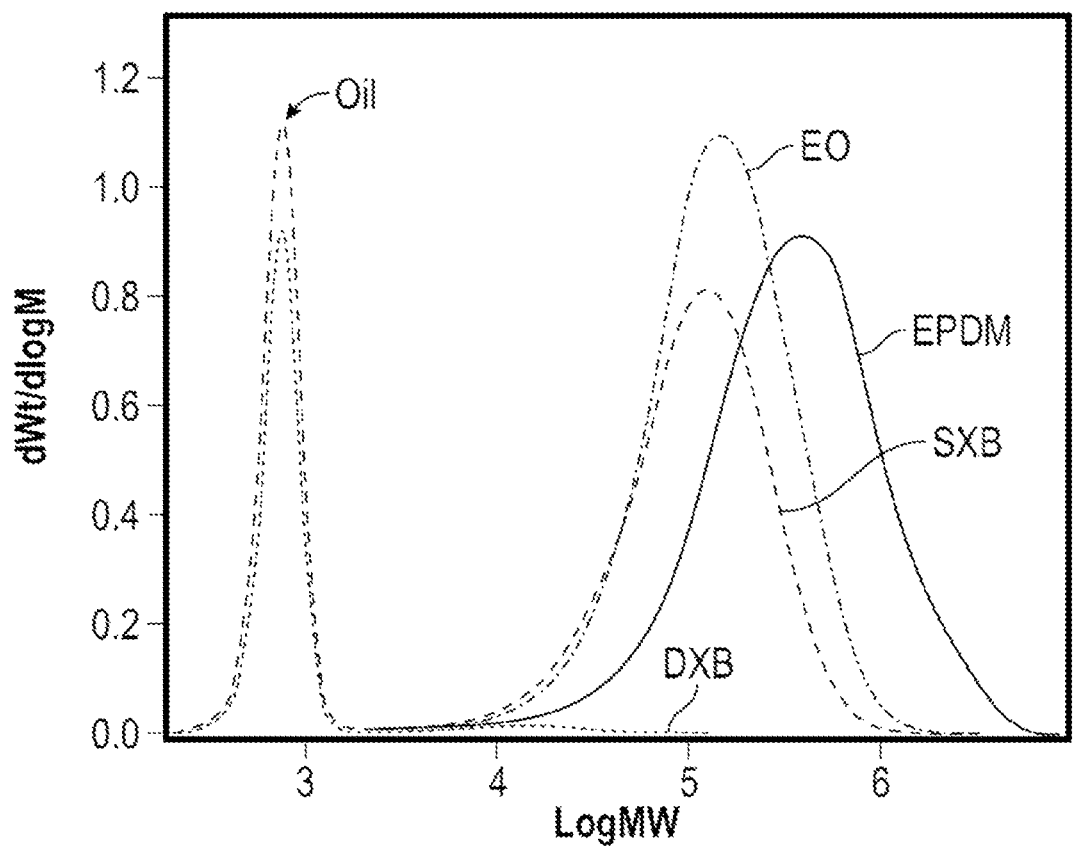
FIG. 2 shows gel permeation chromatograms (GPCs) of a double elastomer system though evolution from an SXB and to DXB of Example 1A below, according to embodiments of the present invention, and also includes the GPCs for the neat EPDM and EO blend components for comparative purposes.

FIG. 2 and Table 6 show that the oil elutes at a peak below 1,000 g/gmole for all samples but decreases slightly with the extent of crosslinking. In the UXB sample, the EO and EPDM are soluble in the TCB and elute freely. In the SXB sample, the free EPDM drops to just 5%, whereas the insolubles rise in proportion and the EO elutes freely. In the DXB sample, only the oil elutes freely, and the EPDM and EO are both insoluble.

Figure 3:
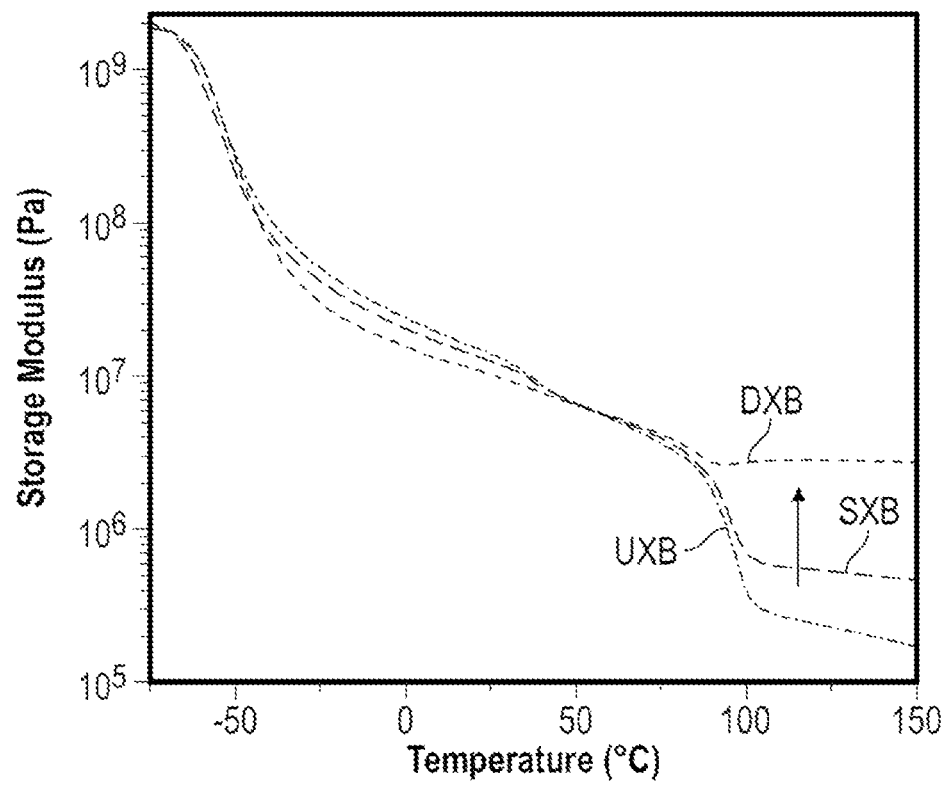
FIG. 3 shows curves of storage modulus versus temperature obtained by dynamic mechanical thermal analysis (DMTA) of the double elastomer system of FIG. 2 though evolution from UXB to SXB and DXB.

DMTA curves of the UXB, SXB and DXB based on 50/50 ENGAGE™ 8480/VISTALON™ 3666. FIG. 3 shows the change in storage modulus of the various blends in this series form un-crosslinked (UXB) to single-crosslinked (SXB) to double crosslinked materials (DXB). It is shown that only after the DXB materials are formed the composite blend has a large storage modulus at temperatures above 100° C. indicating that the continuous phase in the SXB which was responsible for the fluidity has been transformed into a stable crosslinked system. As the crosslinking progresses, the storage modulus above the Tg of ENGAGE™ 8480 (about 95° C.) plateaus in the DXB sample and no longer changes with increasing temperature like it does in the UXB and SXB samples, indicating the EO matrix crosslinked and lost mobility.

Tension Set Versus Crosslinking: The tension sets of the single-crosslinked blend (SXB) and double crosslinked blend (DXB) of Example 1A (70/30 ENGAGE™ 8150/EPDM) were determined at 25° C., 100% elongation for 30 minutes followed by 10 minutes relaxation, and at 70° C., 25% elongation for 22 hours and followed by 30 minutes relaxation. As controls, tension sets were also run on crosslinked EPDM (Vistalon™ 3666/Vistalon™ 7500, RIO/SnCl$_2$/ZnO) (XL-EPDM), peroxide crosslinked ethylene-octene copolymer (ENGAGE™8150/ENGAGE™8480, DiCup 40KE) (XL-EO), and peroxide co-cured EPDM/EO blend (Example 1 blend, DiCup 40KE) (CXB). The results are presented in Table 7.

TABLE 7

Tension Set of Samples at 25° C. and 70° C.

| Sample | Description | Tension Set at 25° C. (%) (100% elongation/ 30 min) | Tension Set at 70° C. (%) (25% elongation/ 22 h) |
|---|---|---|---|
| EO | ENGAGE ™ 8150 | 13.3 | sample melted |
|  | ENGAGE ™ 8480 | 44.8 | 21.3 |
| XL-EO | Crosslinked ENGAGE ™ 8150 | 19.8 | 10 |
|  | Crosslinked ENGAGE ™ 8480 | 48.5 | 25 |
| XL-EPDM | crosslinked VISTALON ™ 3666 | 1.8 | 5.25 |
|  | Crosslinked VISTALON ™ 7500 | 2.8 | 6 |
| SXB | Single crosslinked Example 1A | 6.8 | 21 |
| DXB | Double crosslinked Example 1A | 0.5 | 0 |
| CXB | Co-cured Example 1A | 5.3 | 1.25 |

From these data, it is seen that the DXB sample according to Example 1A was fully recovered at 70° C., whereas none of the other materials were. These data also show dispersed crosslinked EPDM particles provide the key elasticity and the continuous crosslinked EO matrix provide the thermal stability, and there is synergy between the two networks.

Figure 5:
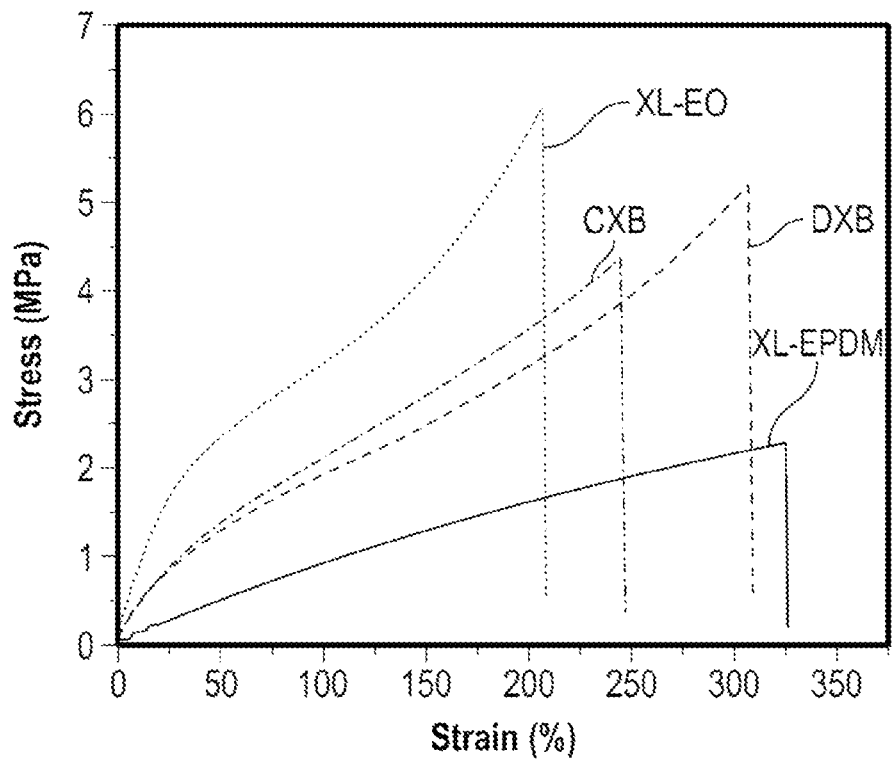
FIG. 5 shows a stress-strain diagram and ultimate elongation of the DXB of FIG. 4, and shows the stress-strain diagrams for the crosslinked EO, crosslinked EPDM, and peroxide co-cured EO/EPDM systems for comparative purposes.

Mechanical Properties: The load-extension and stress-strain curves of the double crosslinked blend (DXB) of Example 1A (70/30 ENGAGE™ 8150/EPDM) were determined as described above. As controls, the curves were also run on peroxide crosslinked ethylene-octene copolymer (ENGAGE™ 8150, DiCup 40KE), crosslinked EPDM (V3666, RIO/SnCl$_2$/ZnO), and peroxide co-cured EPDM/EO blend (Example 1 blend, DiCup 40KE). The results are presented in FIGS. 4 and 5. These results show the DXB of Example 1A had similar hysteresis compared to the co-cured CXB but had better ultimate performance. The blend was effectively tailored with the elasticity of the EPDM, the mechanical strength of the EO matrix. These results also show the possibility to decouple the crosslink density and physical properties by tailoring the morphology and double networks.

Tear Strength: The tear strength of the double crosslinked blend (DXB) of Example 1A (70/30 ENGAGE 8150/EPDM) was determined as described above. As controls, the tear strength was also determined for crosslinked EPDM (V3666, RIO/SnCl$_2$/ZnO), and peroxide co-cured EPDM/EO blend (Example 1A blend, DiCup 40KE). The results are presented in Table 8.

TABLE 8

Tear Strength of Double-Crosslinked Blends at 25° C.

| Example | Polyolefin | Polyolefin/EPDM ratio (wt/wt) | Tear Strength (N/mm) |
|---|---|---|---|
| XL-EPDM[a] | — | — | 9.9 |
| CXB[b] | ENGAGE ™ 8150 | 70/30 | 11.4 |
| 1A | ENGAGE ™ 8150 | 70/30 | 13.2 |
| 2B | ENGAGE ™ 8200 | 50/50 | 12.8 |
| 5A | ENGAGE ™ 8480 | 70/30 | 31.1 |
| 5B | ENGAGE ™ 8480 | 50/50 | 22.8 |

[a]crosslinked VISTALON ™ 3666 as a control.
[b]peroxide co-cured EPDM/EO blend (Example 1A blend, DiCup 40KE) as a control These results show the possibility to improve the tear strength by incorporating an EO matrix of higher Tm while maintaining good elastic properties. DXB of Example 1A had slightly improved tear strength compared to the co-cured CXB. In D×B samples, the elasticity was governed by dispersed crosslinked EPDM, and the strength mainly governed by the continuous EO matrix.

Plasticizer effect: The use of plasticizer facilitates processing of the SXB material. The effect is determined by the lowering of the viscosity of the blend. The melt flow rate (MFR) at condition 21.6 kg, 230° C. was determined for the various SXB materials of Examples 1A-5B at different levels of post oil (SUNPAR™ 150M). The oil was added after the single crosslinking step by adding the indicated amount of oil, which is based on the weight of the rubber, and blending using the BRABENDER™ PLASTICORDER at 100° C. for 5 minutes. The tension set at RT and 100% elongation for 10 minutes was also evaluated. The results are presented in Table 9:

TABLE 9

Properties of SXB of Example 1B at Various Oil Loadings[a]

| Properties | Post Oil Loading (wt %)[b] | | | | |
|---|---|---|---|---|---|
| | 0 | 21 | 42 | 64 | 86 |
| MFR (g/10 min, 21.6 kg@230° C.) | 0.9 | 28 | 127 | 1.7[c] | 3.1[c] |
| Tension Set (%, 100% elongation at RT for 10 min) | 4.3 | 5 | 4.5 | 4 | 4 |
| Shore A Hardness | 43.8 | 32 | 26 | 20 | 16.5 |
| Tensile Strength (MPa) | 4 | 2.8 | 2.7 | 2.3 | 1.9 |
| Elongation at Break (%) | 412 | 420 | 479 | 542 | 537 |

[a]SXB of Example 1B, 50/50 ENGAGE ™ 8150/VISTALON ™ 3666
[b]based on total weight
[c]MFR tested under condition of 2.16 kg/230° C.

Figure 6:
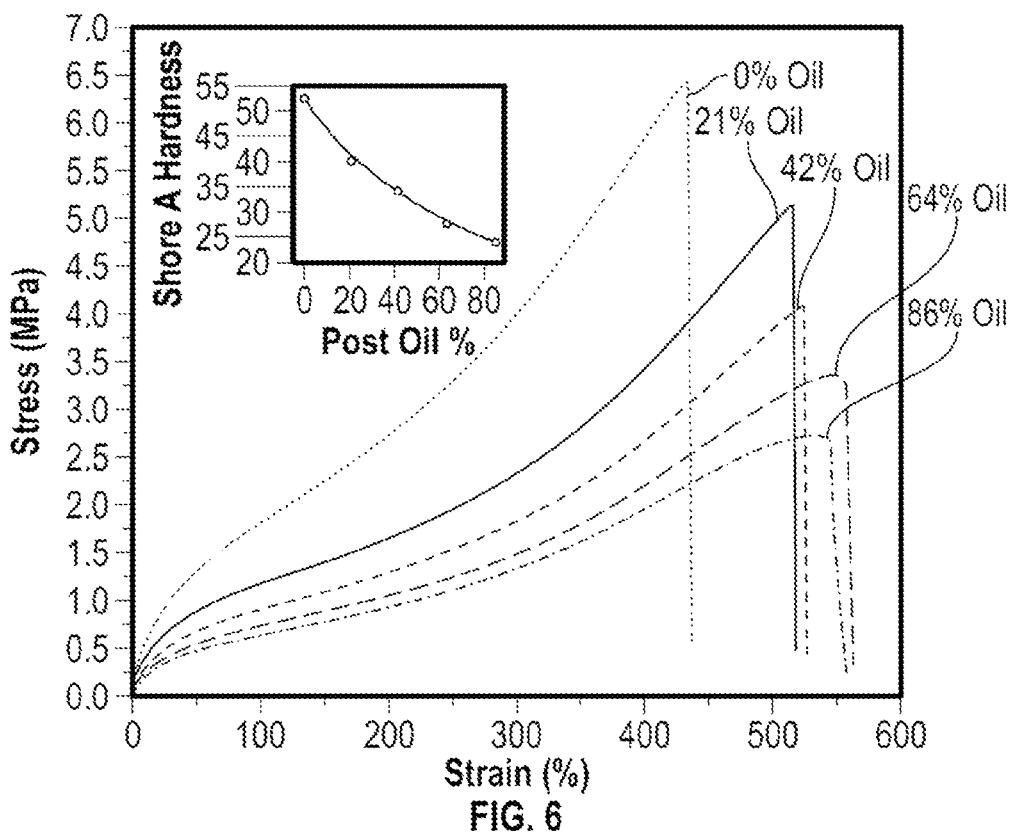
FIG. 6 shows stress-strain diagrams and a plot of Shore A hardness of the SXB of Example 1A for various post-oil loadings, according to embodiments of the present invention.

The stress strain curves and Shore A hardness at various post-oil loadings of SXB of Example 3B are shown in FIG. 6. The trends shown in this figure are typical of the other examples and demonstrate the plasticizer (oil) is capable of lowering modulus while improving stretchability and having little effect on the low tension set.

All documents described herein are incorporated by reference herein for all jurisdictions where permitted, including any priority documents and/or testing procedures to the extent they are not inconsistent with this text. As is apparent from the foregoing general description and the specific embodiments, while forms of this disclosure have been illustrated and described, various modifications can be made without departing from the spirit and scope of this disclosure. Accordingly, it is not intended that this disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While this disclosure has been described with respect to a number of embodiments and examples, those skilled in the art, having benefit of this disclosure, will appreciate that other embodiments can be devised which do not depart from the scope and spirit of this disclosure.

What is claimed is:

1. A sequential, double-vulcanization method, comprising the steps of:
   (a) mixing first and second immiscible elastomers together with a first additive package comprising component(s) of a first curative system, and optionally component(s) of a first plasticizer system, or component(s) of a first filler system, or a combination thereof;
   (b) activating the first curative system to vulcanize the first elastomer in a dispersed phase of the first elastomer to form a partially vulcanized mixture while maintaining melt flowability of the second elastomer in a continuous phase;
   (c) optionally, mixing the partially vulcanized mixture together with a second additive package comprising component(s) of a second curative system, component(s) of a second plasticizer system, component(s) of a second filler system, or a combination thereof; and
   (d) vulcanizing the second elastomer in the continuous phase by radiation or by activating a chemical curative in the second curative system.

2. The sequential, double-vulcanization method of claim 1, wherein at least one component of the first additive package is preferentially distributed in the first elastomer during the first curative system activation step and wherein at least one component of the second additive package is preferentially distributed in the second elastomer during the second curative system activation step.

3. The sequential, double-vulcanization method of claim 2,
   wherein the preference of the at least one component of the first additive package for the first elastomer is modulated by one or more of selecting a viscosity of the first elastomer, selecting a chemical identity of the first elastomer, selecting a surface chemistry of the first filler system, selecting a chemical nature of the first plasticizer system, selecting an order of addition of the first filler system and the first plasticizer system, selecting mixing conditions in step (a) comprising shear rate, temperature, and duration, and combinations thereof; and/or
   wherein the preference of the at least one component of the second additive package for the second elastomer is modulated by one or more of selecting a viscosity of the second elastomer, selecting a chemical identity of the second elastomer, selecting a surface chemistry of the second filler system, selecting a chemical nature of the second plasticizer system, selecting an order of addition of the second filler system and the second plasticizer system, selecting mixing conditions in step (c) comprising shear rate, temperature, and duration, and combinations thereof.

4. The sequential, double-vulcanization method of claim 1, wherein the first and/or second additive packages further comprise an antioxidant system.

5. The sequential, double-vulcanization method of claim 1, further comprising processing the partially vulcanized mixture prior to vulcanization of the second elastomer.

6. The sequential, double vulcanization method of claim 5, wherein the processing of the partially vulcanized mixture comprises molding, calendaring, or extruding the partially vulcanized mixture.

7. The sequential, double-vulcanization method of claim 5, wherein the processing of the partially vulcanized mixture comprises recovering the partially vulcanized mixture following activation of the first curative system and prior to the vulcanization of the second elastomer.

8. The sequential, double-vulcanization method of claim 1, wherein the second curative system is activated by heating the partially vulcanized mixture to an activation temperature of the second curative system that is higher than an activation temperature of the first curative system.

9. The sequential, double-vulcanization method of claim 8, further comprising mixing the second curative system or a component thereof with the mixture of the first and second immiscible elastomers prior to activation of the first curative system.

10. The sequential, double-vulcanization method of claim 8, wherein the first elastomer comprises an unsaturated elastomer, wherein the second elastomer comprises an alpha-olefin elastomer, wherein the first curative system comprises resin in oil and a co-catalyst, and wherein the second curative system comprises peroxide.

11. A shaped article produced by the sequential, double-vulcanization method of claim 5.

12. A double-vulcanization system, comprising:
(1) first and second immiscible elastomers;
(2) a first additive package comprising component(s) of a first curative system, and optionally component(s) of a first plasticizer system, component(s) of a first filler system, or a combination thereof;
(3) wherein the first curative system is activatable to vulcanize the first elastomer in a dispersed phase of the first elastomer to form a partially vulcanized mixture while maintaining melt flowability of the second elastomer in a continuous phase;
(4) a second additive package comprising component(s) of a second curative system, component(s) of a first plasticizer system, component(s) of a first filler system, or a combination thereof; and
(5) wherein the second curative system is activatable to vulcanize the second elastomer in the continuous phase by radiation or by activating a chemical curative in the second curative system.

13. The double-vulcanization system of claim 12, wherein at least one component of the first additive package is preferentially distributed in the first elastomer during dynamic vulcanization and wherein at least one component of the second additive package is preferentially distributed in the second elastomer during the activation of the second curative system activation step.

14. The double-vulcanization system of claim 13:
wherein the preference of the at least one component of the first additive package for the first elastomer can be modulated by one or more of selecting a viscosity of the first elastomer, selecting a chemical identity of the first elastomer, selecting a surface chemistry of the first filler system, selecting a chemical nature of the first plasticizer system, selecting an order of addition of the first filler system and the first plasticizer system, selecting mixing conditions for the first additive package comprising shear rate, temperature, and duration, and combinations thereof; and/or
wherein the preference of the at least one component of the second additive package for the second elastomer can be modulated by one or more of selecting a viscosity of the second elastomer, selecting a chemical identity of the second elastomer, selecting a surface chemistry of the second filler system, selecting a chemical nature of the second plasticizer system, selecting an order of addition of the second filler system and the second plasticizer system, selecting mixing conditions for the second additive package comprising shear rate, temperature, and duration, and combinations thereof.

15. The double-vulcanization system of claim 12, wherein the first and/or second additive packages further comprise an antioxidant system.

16. The double-vulcanization system of claim 12, wherein the partially vulcanized mixture is recoverable following activation of the first curative system and prior to the vulcanization of the second elastomer.

17. The double-vulcanization system of claim 12, wherein the second additive package is mixable with the partially vulcanized mixture prior to vulcanization of the second elastomer.

18. The double-vulcanization system of claim 12, wherein the second curative system is activatable by heating the partially vulcanized mixture to an activation temperature of the second curative system that is higher than an activation temperature of the first curative system.

19. The double-vulcanization system of claim 18, wherein one or more components of the second curative system are present in the mixture of the first and second immiscible elastomers during activation of the first curative system.

20. The double-vulcanization system of claim 12, wherein the first elastomer comprises an unsaturated elastomer, wherein the second elastomer comprises an alpha-olefin elastomer, wherein the first curative system comprises resin in oil and a co-catalyst, and wherein the second curative system comprises peroxide.

21. A double-vulcanized elastomer composition, comprising:
(A) a mixture of first and second immiscible elastomers;
(B) wherein the first elastomer is vulcanized with a first curative system in a dispersed phase;
(C) wherein the second elastomer is vulcanized in a continuous phase with a second curative system;
(D) a first additive package comprising at least one component preferentially received by the first elastomer, the first additive package comprising component(s) of the first curative system, component(s) of a first plasticizer system, component(s) of a first filler system, or a combination thereof; and
(E) a second additive package comprising at least one component preferentially received by the second elastomer, the second additive package comprising component(s) of the second curative system, component(s) of a second plasticizer system, component(s) of a second filler system, or a combination thereof.

22. The double-vulcanized elastomer composition of claim 21:
wherein the preference of the at least one component of the first additive package for the first elastomer is modulated by one or more of a viscosity of the first elastomer, a chemical identity of the first elastomer, a surface chemistry of the first filler system, a chemical nature of the first plasticizer system, an order of addition of the first filler system and the first plasticizer system, and mixing conditions for the first additive package comprising shear rate, temperature, and duration; and/or wherein the preference of the at least one component of the second additive package for the second elastomer is modulated by one or more of a viscosity of the second elastomer, a chemical identity of the second elastomer, a surface chemistry of the second filler system, a chemical nature of the second plasticizer system, an order of addition of the second filler system and the second plasticizer system, and mixing conditions for the second additive package comprising shear rate, temperature, duration.

23. The double-vulcanized elastomer composition of claim 21, wherein the first and/or second additive packages further comprise an antioxidant system.

24. The double-vulcanized elastomer composition of claim 21, wherein the elastomer composition comprises the product of the process comprising the sequential steps of:
    (a) mixing the first and second immiscible elastomers together with the first additive package;
    (b) activating the first curative system under dynamic conditions to vulcanize the first elastomer in a dispersed phase of the first elastomer to form a partially vulcanized mixture while maintaining melt flowability of the second elastomer in a continuous phase;
    (c) optionally mixing the partially vulcanized mixture with the second additive package; and
    (d) vulcanizing the second elastomer.

25. The double-vulcanized elastomer composition of claim 24, wherein the process further comprises the step of processing the partially vulcanized mixture prior to vulcanization of the second elastomer.

26. The double-vulcanized elastomer composition of claim 24, wherein the process further comprises the step of, prior to vulcanization of the second elastomer, admixing the partially vulcanized mixture with the second additive package.

27. The double-vulcanized elastomer composition of claim 24, wherein the process further comprises the step of heating the partially vulcanized mixture to an activation temperature of the second curative system that is higher than an activation temperature of the first curative system.

28. The double-vulcanized elastomer composition of claim 27, wherein the process further comprises the step of mixing at least one component of the second curative system with the mixture of the first and second immiscible elastomers prior to activation of the first curative system.

29. The double-vulcanized elastomer composition of claim 21, wherein the first elastomer comprises an unsaturated elastomer, wherein the second elastomer comprises an alpha-olefin elastomer, wherein the first curative system comprises resin in oil and a co-catalyst, and wherein the second curative system comprises peroxide.

30. The sequential, double-vulcanization method of claim 1, wherein the mixture comprising cured first elastomer and second elastomer has a melt flowability of 0.7 to less than 500 g/10 min.

31. The sequential, double-vulcanization method of claim 1, wherein the first elastomer is present at 1 to 99 wt % and the second elastomer is present at 00 to 1 wt %, based upon the weight of the elastomers.

32. The sequential, double-vulcanization method of claim 1, wherein the first elastomer comprises one or more of cis-1,4-polyisoprene, natural rubber, trans-1,4-polyisoprene, gutta percha; isoprene rubber; polybutadiene; chloroprene rubber; butyl rubber, halogenated butyl rubber; styrene-butadiene rubber; nitrile rubber; hydrogenated nitrile rubbers; and ethylene-propylene-diene monomer rubber.

33. The sequential, double-vulcanization method of claim 1, wherein the second elastomer comprises one or more of ethylene-propylene rubber; ethylene-octene copolymer; epichlorohydrin rubber; polyacrylic rubber; silicone rubber; fluorosilicone rubber; fluoroelastomers; polyether block amides; chlorosulfonated polyethylene; and ethylene-vinyl acetate.

* * * * *